United States Patent
Kang

(10) Patent No.: US 10,879,965 B2
(45) Date of Patent: Dec. 29, 2020

(54) APPARATUS AND METHOD FOR TRANSMITTING REFERENCE SIGNAL IN WIRELESS COMMUNICATION SYSTEM

(71) Applicant: Samsung Electronics Co., Ltd., Suwon-si (KR)

(72) Inventor: Namkoo Kang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/488,426

(22) PCT Filed: Feb. 26, 2018

(86) PCT No.: PCT/KR2018/002326
§ 371 (c)(1),
(2) Date: Aug. 23, 2019

(87) PCT Pub. No.: WO2018/155977
PCT Pub. Date: Aug. 30, 2018

(65) Prior Publication Data
US 2020/0007197 A1 Jan. 2, 2020

(30) Foreign Application Priority Data
Feb. 24, 2017 (KR) .................. 10-2017-0024988

(51) Int. Cl.
*H04B 7/0408* (2017.01)
*H04B 7/0456* (2017.01)
*H04B 7/10* (2017.01)
(52) U.S. Cl.
CPC ......... *H04B 7/0408* (2013.01); *H04B 7/0478* (2013.01); *H04B 7/10* (2013.01)
(58) Field of Classification Search
CPC ....... H04B 7/0408; H04B 7/0478; H04B 7/10
See application file for complete search history.

(56) References Cited

U.S. PATENT DOCUMENTS 9,654,264 B2 * 5/2017 Athley .................. H04L 5/0048
2002/0187812 A1 12/2002 Guo
(Continued)

FOREIGN PATENT DOCUMENTS

| EP | 1 973 238 A1 | 9/2008 |
| KR | 10-2008-0023605 A | 3/2008 |

(Continued)

OTHER PUBLICATIONS

Zhu et al., Two-Dimensional AoD and AoA Acquisition for Wideband Millimeter-Wave Systems With Dual-Polarized MIMO, IEEE Transactions on Wireless Communications, vol. 16 No. 12, Dec. 2017.*

(Continued)

*Primary Examiner* — Freshteh N Aghdam
(74) *Attorney, Agent, or Firm* — Jefferson IP Law, LLP

(57) ABSTRACT

The present disclosure relates to a pre-5th-Generation (5G) or 5G communication system to be provided for supporting higher data rates Beyond 4th-Generation (4G) communication system such as Long Term Evolution (LTE). According to various embodiments of the present disclosure, an apparatus of a base station of a wireless communication system may comprise at least one transceiver, and at least one processor operatively coupled to the at least one transceiver. The at least one processor is configured to transmit, to a terminal, a plurality of reference signals including a first plurality of reference signals corresponding to a first polarized wave and a second plurality of reference signals corresponding to a second polarized wave, and receive feedback information indicative of at least one reference signal of the plurality of reference signals, wherein the first plurality of reference signals respectively correspond to a plurality of beams, the second plurality of reference signals respectively correspond to the plurality of beams, and the (Continued)

second polarized wave may be orthogonal to the first polarized wave.

20 Claims, 12 Drawing Sheets

(56) References Cited

U.S. PATENT DOCUMENTS

| | | |
|---|---|---|
| 2007/0285312 A1 | 12/2007 | Gao et al. |
| 2009/0278759 A1 | 11/2009 | Moon et al. |
| 2013/0278460 A1 | 10/2013 | Ai et al. |
| 2014/0206304 A1 | 7/2014 | Zhang et al. |
| 2016/0135060 A1* | 5/2016 | Branlund ............... H04B 7/10 370/280 |
| 2016/0157218 A1 | 6/2016 | Nam et al. |
| 2016/0182137 A1* | 6/2016 | Onggosanusi ....... H04B 7/0469 370/329 |
| 2017/0288758 A1* | 10/2017 | Kakishima ............ H04L 5/0014 |
| 2018/0034518 A1* | 2/2018 | Schulz ................... H04B 1/48 |
| 2018/0049141 A1 | 2/2018 | Choi et al. |
| 2018/0076856 A1* | 3/2018 | Tong .................... H04B 7/0632 |
| 2018/0076870 A1 | 3/2018 | Kim et al. |
| 2018/0175925 A1* | 6/2018 | Liu ..................... H04L 25/0242 |
| 2018/0212662 A1* | 7/2018 | Ren ....................... H04W 24/10 |
| 2018/0375560 A1* | 12/2018 | Wei ...................... H04B 7/0486 |
| 2020/0220607 A1* | 7/2020 | Lou ...................... H04B 7/0695 |

FOREIGN PATENT DOCUMENTS

| | | |
|---|---|---|
| KR | 10-2014-0005076 A | 1/2014 |
| WO | 2016/098925 A1 | 6/2016 |
| WO | 2016/129725 A1 | 8/2016 |
| WO | 2016/148352 A1 | 9/2016 |

OTHER PUBLICATIONS

European Search Report dated Nov. 21, 2019, issued in European Application No. 18758094.9-1220.
3GPP TSG RAN WG1 Meeting #86bis Intel Corporation. Remaining details on overhead for Class B CSI-RS. R1-16xxxx. Lisbon, Portugal Oct. 10-14, 2016.

* cited by examiner

APPARATUS AND METHOD FOR TRANSMITTING REFERENCE SIGNAL IN WIRELESS COMMUNICATION SYSTEM

BACKGROUND ART

The disclosure relates generally to a wireless communication system and, more particularly, to an apparatus and a method for transmitting a reference signal in a wireless communication system.

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In order to overcome the problem of a path loss due to the characteristics of the ultra-high frequency (e.g., mmWave) band, a 5G communication system is operated to increase a signal gain by using a beamforming technique. However, in a beamforming-based wireless communication system, a transmission loss is caused when a terminal is located indoors, and such transmission losses show a large difference therebetween according to polarizations. Therefore, there is a need for a method for searching for a direction of a beam and an optimal polarization.

DISCLOSURE OF INVENTION

Technical Problem

The disclosure provides an apparatus and a method for variously transmitting a reference signal in a wireless communication system, on the basis of the above-described discussion.

Also, the disclosure provides an apparatus and a method for transmitting a reference signal in consideration of a polarization in a wireless communication system.

Also, the disclosure provides an apparatus and a method for transmitting a reference signal in consideration of a beam direction and a polarization in a wireless communication system.

Further, the disclosure provides an apparatus and a method for transmitting reference signal having different polarizations in the same time resource in a wireless communication system.

According to various embodiments of the disclosure, an apparatus of a base station of a wireless communication system may include: at least one transceiver; and at least one processor operatively coupled to the at least one transceiver. The at least one transceiver may be configured to: transmit, to a terminal, multiple reference signals including multiple first reference signals corresponding to a first polarization and multiple second reference signals corresponding to a second polarization; and receive feedback information indicating at least one reference signal among the multiple reference signals, wherein the multiple first reference signals respectively correspond to multiple beams, the multiple second reference signals respectively correspond to the multiple beams, and the second polarization is orthogonal to the first polarization.

According to various embodiments of the disclosure, an apparatus of a terminal of a wireless communication system may include: at least one transceiver; and at least one processor operatively coupled to the at least one transceiver. The at least one transceiver may be configured to: receive, from a base station, multiple reference signals including multiple first reference signals corresponding to a first polarization and multiple second reference signals corresponding to a second polarization; and transmit, to the base station, feedback information indicating at least one of the multiple reference signals, wherein the multiple first reference signals respectively correspond to multiple beams, the multiple second reference signals respectively correspond to the multiple beams, and the second polarization is orthogonal to the first polarization.

According to various embodiments of the disclosure, an operating method of a base station of a wireless communication system may include: transmitting, to a terminal, multiple reference signals including multiple first reference signals corresponding to a first polarization and multiple second reference signals corresponding to a second polarization; and receiving feedback information indicating at least one reference signal among the multiple reference signals, wherein the multiple first reference signals respectively correspond to multiple beams, the multiple second reference signals respectively correspond to the multiple beams, and the second polarization is orthogonal to the first polarization.

According to various embodiments of the disclosure, an operating method of a terminal of a wireless communication system may include: receiving, from a base station, multiple reference signals including multiple first reference signals corresponding to a first polarization and multiple second reference signals corresponding to a second polarization; and transmitting, to the base station, feedback information indicating at least one of the multiple reference signals, wherein the multiple first reference signals respectively correspond to multiple beams, the multiple second reference signals respectively correspond to the multiple beams, and the second polarization is orthogonal to the first polarization.

An apparatus and a method according to various embodiments of the disclosure can predict an optimal combination of a beam direction and a polarization by transmitting a reference signal in consideration of a beam direction and a polarization.

An apparatus and a method according to various embodiments of the disclosure can increase the degree of freedom of a system operation by transmitting polarization information without a separate rule between a base station and a terminal.

An apparatus and a method according to various embodiments of the disclosure can improve data quality by using polarization information.

An apparatus and a method according to various embodiments of the disclosure can transmit reference signals having different polarizations through the same time resource unit by using a covering code.

Advantageous effects obtained in the disclosure are not limited to the above-mentioned effects, and other effects not mentioned above can be clearly understood from the following description by those having common knowledge in the technical field to which the disclosure pertains.

BEST MODE FOR CARRYING OUT THE INVENTION

Figure 1:
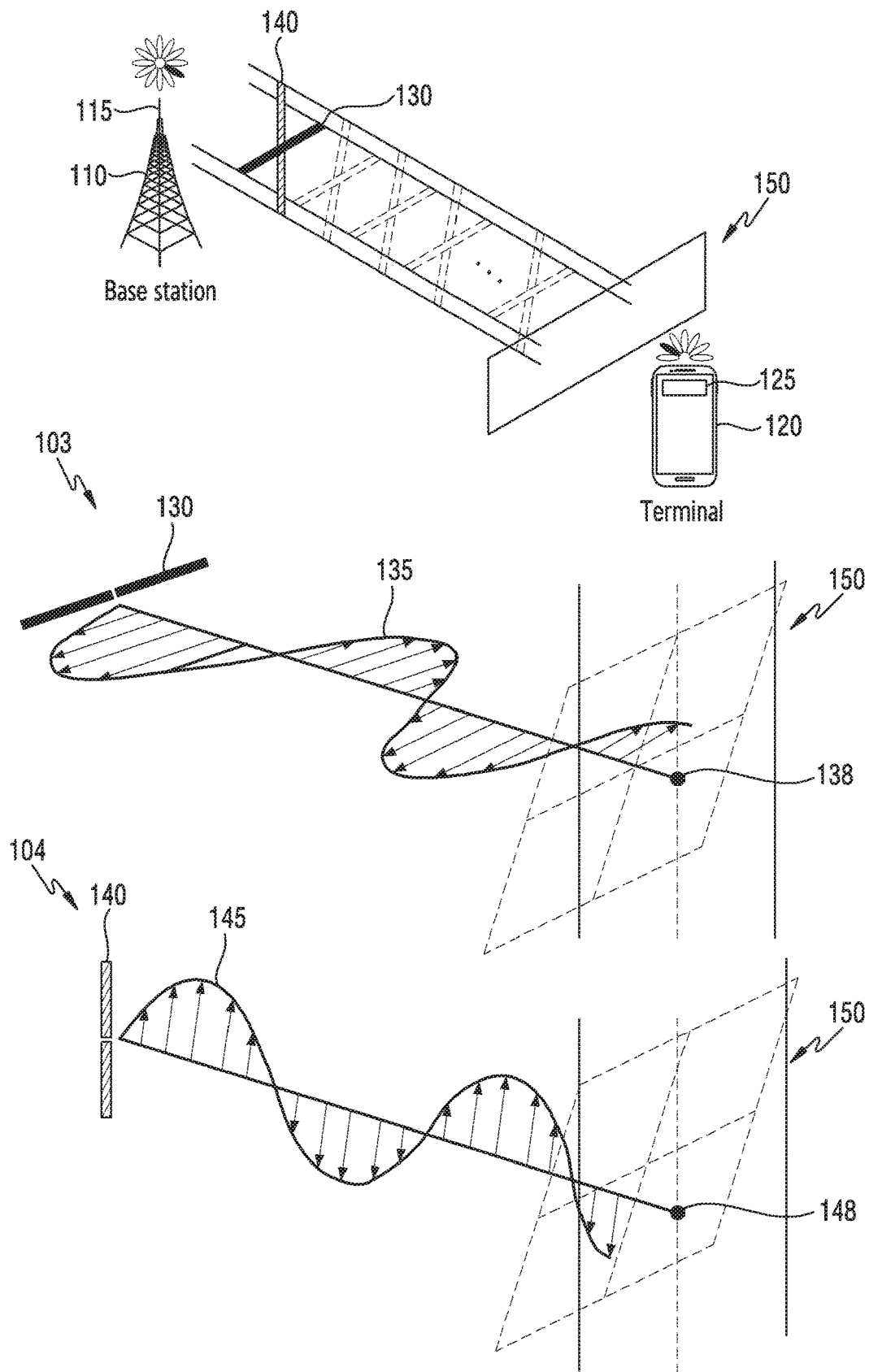
FIG. 1 illustrates a wireless communication environment according to various embodiments of the disclosure.

The terms as used in the disclosure are merely used to describe particular embodiments and are not intended to limit the scope of other embodiments. A singular expression may include a plural expression unless the context clearly indicates otherwise. All terms used herein, including technical terms and scientific terms, have the same meanings as commonly understood by those having common knowledge in the technical field to which the disclosure pertains. Such terms as those defined in a generally-used dictionary among the terms as used in the disclosure are to be interpreted to have the meanings identical or similar to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

In various embodiments of the disclosure as described hereinafter, a hardware-based approach will be described as an example. However, various embodiments of the disclosure include technology that uses both hardware and software, and thus do not exclude a software-based approach.

In the disclosure, the expression "A or B" or "at least one of A and/or B" may include all possible combinations of items enumerated together. The expression "a first", "a second", "the first", or "the second" may modify corresponding elements regardless of the order or the importance thereof, and are used merely to distinguish each element from the others without unduly limiting the elements. When an element (e.g., first element) is referred to as being "(functionally or communicatively) connected", or "coupled" to another element (second element), the element may be connected directly to said another element or connected to the another element through yet another element (e.g., third element).

In the disclosure, the expression "configured to" may be used interchangeably with, for example, "suitable for", "having the capacity to", "adapted to", "made to", "capable of", or "designed to" in terms of hardware or software, according to circumstances. In some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a general-purpose processor (e.g., Central Processing Unit (CPU) or Application Processor (AP)) that can perform the corresponding operations by executing one or more software programs stored in a memory device.

Hereinafter, the disclosure relates to an apparatus and a method for transmitting a Reference Signal (RS) in a wireless communication system. Specifically, the disclosure will describe operations of determining an optimal combination of a beam direction and a polarization through a procedure for transmitting reference signals having different polarizations in a wireless communication system.

Terms in the following description are used for convenience of description, wherein examples of the terms include a term referring to control information, a term for calculation state (e.g., a mode and an operation), a term referring to data (e.g., information and a value), a term referring to network entities (e.g., a base station and a 5GNB), a term referring to messages (e.g., feedback and a signal), and a term referring to elements of an apparatus. Accordingly, the disclosure is not limited to the following terms and other terms having equivalent technical meanings may be used.

Further, in the disclosure, various embodiments are described using the terms used in some communication standards (e.g., a Long-Term Evolution (LTE) system and LTE-Advanced (LTE-A)), but this configuration is only an example for description. Various embodiments may also be easily modified and applied to another communication system.

FIG. 1 illustrates a wireless communication environment according to various embodiments of the disclosure. FIG. 1 illustrates an example of a base station 110 and a terminal 120 as some of nodes using a wireless channel in a wireless communication system. FIG. 1 illustrates only one base station, but may further include another base station identical or similar to the base station 110.

The base station 110 is a network infrastructure which provides radio access to the terminal 120. The base station 110 has a coverage defined by a predetermined geographic area based on the distance over which a signal can be transmitted. The base station 110 may be referred to as an "Access Point (AP)", an "eNodeB (eNB)", a "5th generation node (5G node)", a "5G NodeB (NB)", a "wireless point", a "Transmission/Reception Point (TRP)", or other terms having an equivalent technical meaning.

The terminal 120 is an apparatus used by a user, and performs communication with the base station 110 through a wireless channel. In some cases, the terminal 120 may be operated without user involvement. That is, the terminal 120 is an apparatus that performs Machine-Type Communication (MTC), and may not be carried by a user. The terminal 120 may be referred to as a "User Equipment (UE)", a "mobile station", a "subscriber station", a "remote terminal", a "wireless terminal", a "user device", or other terms having an equivalent technical meaning.

The base station 110 and the terminal 120 may transmit and receive radio signals in a millimeter wave (mmWave) band (e.g., 28 GHz, 30 GHz, 38 GHz, or 60 GHz). In this example, in order to improve a channel gain, the base station 110 and the terminal 120 may perform beamforming. In this example, the beamforming includes transmission beamforming and reception beamforming. That is, the base station 110 and the terminal 120 may assign directivity to a transmission signal or a reception signal. To this end, the base station 110 and the terminal 120 may perform a beam search procedure. The base station 110 or the terminal 120 may select a beam determined through the beam search procedure.

Referring to FIG. 1, the base station 110 may transmit a signal to the terminal 120. The signal may be an electromagnetic wave. The electromagnetic wave may include an electric field and a magnetic field. An electric field may have energy about 377-times higher than that of a magnetic field. Accordingly, when an antenna 125 of the terminal 120 is parallel to an electric field of the electromagnetic wave, the terminal 120 may acquire a maximum reception gain. This is because, when the antenna 125 is perpendicular to the electric field of the electromagnetic wave, a transmission direction of a signal and reception of the signal cancel each other out, and thus the signal cannot be normally delivered.

In order to efficiently transmit data, the base station 110 may be required to transmit a signal having an electric field parallel to the antenna 125. In other words, the base station 110 may be required to transmit a signal in consideration of polarization. Polarization signifies a propagation direction of an electromagnetic wave and a polarity direction of an electric field.

The base station 110 may include an antenna 115. The antenna 115 may be configured to provide two different polarization characteristics (which may be referred to as "polarization types", hereinafter "polarizations"). The antenna 115 may be a cross-pol antenna including two dipole antennas 130 and 140. Hereinafter, a description will be made with reference to a cross-pol antenna illustrated in FIG. 1, but the disclosure is not limited thereto. Therefore, the disclosure can be applied to any antenna configured to provide two different polarizations. The two different polarizations may be a first polarization and a second polarization. The second polarization may be orthogonal to the first polarization. For example, the first polarization may be a horizontal polarization, and the second polarization may be a vertical polarization. In this example, the terms "horizontal" and "vertical" are used with reference to the ground. In another example, the first polarization may be a +45° polarization in a cross-pol antenna, and the second polarization may be a −45° polarization in the cross-pol antenna. Also, the second polarization may be a polarization opposite to the first polarization. For example, the first polarization may be a Right-Hand Circular Polarization (RHCP), and the second polarization may be a Left-Hand Circular Polarization (LHCP). Hereinafter, for convenience of description, a description will be made with reference to a configuration in which the first polarization is a horizontal polarization and the second polarization is a vertical polarization, but the first polarization and the second polarization may be the above-described polarizations, two other polarizations orthogonal to each other, or polarizations opposite to each other, according to a structure of an antenna. The dipole antenna 130 may be an antenna which provides a first polarization. The dipole antenna 140 may be an antenna which provides a second polarization. The first polarization may be a horizontal polarization, and the second polarization may be a vertical polarization. The terminal 120 may include the antenna 125. The antenna 125 may be configured to provide at least one polarization.

Hereinafter, a description will be made of a situation in which the base station 110 is located at a position higher from the ground than that of the terminal 120 and the terminal is located indoors. The base station 110 may transmit a first signal with a first polarization (e.g., a horizontal polarization), or may transmit a second signal with a second polarization (e.g., a vertical polarization). The first signal and the second signal transmitted by the base station 110 may pass through an obstacle 150, and may then be delivered to the terminal 120. Since the first signal and the second signal pass through the obstacle 150, a transmission loss may be caused. In this example, a transmission loss of the first signal may differ from that of the second signal, according to which polarizations the first signal and the second signal have been transmitted with, respectively.

Referring to a wireless communication environment 103, the first signal is transmitted with a horizontal polarization which is the first polarization. An electromagnetic wave of the first signal includes an electric wave 135. The electric wave 135 of the first signal travels toward the terminal while oscillating in a plane parallel to the ground. The electric wave 135 of the first signal travels toward the terminal 120 while oscillating in a direction parallel to the dipole antenna 130. The first signal comes into contact with the obstacle 150 at a point 138. A boundary surface between a medium (e.g., air) and another medium (e.g., an object constituting the obstacle 150) on a wireless communication channel is formed by the obstacle 150. A straight line corresponding to an oscillation direction of the electric wave 135 of the first signal is parallel to a plane formed by the obstacle 150.

Referring to a wireless communication environment 104, the second signal is transmitted with a vertical polarization which is the second polarization. An electromagnetic wave of the second signal includes an electric wave 145. The electric wave 145 of the second signal travels toward the terminal while oscillating in a plane perpendicular to the ground. The electric wave 145 of the second signal travels toward the terminal 120 while oscillating in a direction parallel to the dipole antenna 140. The second signal comes into contact with the obstacle 150 at a point 148. A straight line corresponding to an oscillation direction of the electric wave 145 of the second signal is not parallel to a plane formed by the obstacle 150.

When the wireless communication environment 103 is compared with the wireless communication environment 104, a transmission gain of the first signal measured by the terminal 120 is higher than that of the second signal. This is because an angle formed by the oscillation direction of the electric wave 145 and the boundary surface of the obstacle 150 is larger than 0°. Due to the difference between such angles formed by oscillation directions of signals and the obstacle 150, the second signal may be subjected to a loss larger than that of the first signal. Therefore, it can be noted that transmission of a signal with a horizontal polarization by the base station 110 is more advantageous than transmission of a signal with a vertical polarization by the base station 110 in terms of a reception gain of the terminal 120.

Although not illustrated in FIG. 1, when the base station 110 is located from the ground at a position in a range equal to that of the terminal 120, differently from the case in which the base station 110 is located at a position higher than that of the terminal 120, in the case of a horizontal polarization, a straight line corresponding to the oscillation direction of the electric wave 135 may not be parallel to a boundary surface formed by any obstacle. This is because a building including the terminal 120 is not always located in parallel with the dipole antenna 130 of the base station 110. In contrast, a vertical polarization does not show a difference according to a height of the base station 110 and that of the terminal 120 from the ground, and thus a straight line corresponding to the oscillation direction of the electric wave 145 may be parallel to the boundary surface of the obstacle. Therefore, in this example, transmission of a signal with a vertical polarization by the base station 110 is more advantageous than transmission of a signal with a horizontal polarization by the base station 110 in terms of a reception gain of the terminal 120.

In the above-described two situations, for convenience of description, transmission of a signal with a horizontal polarization, in which a parallel relationship with the boundary surface of the obstacle is established, and transmission of a signal with a vertical polarization, in which a parallel relationship therewith is not established, are described by way of example, but the disclosure is not limited thereto. The disclosure may be applied to: both a case in which, although an oscillation direction of an electric wave is not necessarily parallel to a boundary surface in transmitting a signal with a particular polarization, there occurs a difference between angles formed by the boundary surface and oscillation directions of two polarizations orthogonal to each other; and a case in which there occurs a difference between reception gains of the terminal 120.

As illustrated in FIG. 1, through adjustment of a direction of a polarization, the base station 110 can minimize a transmission loss and a polarization loss (a loss due to non-coincidence between polarizations) in a downlink to the terminal 120. Therefore, in order to transmit data to the terminal 120, the base station 110 is required to determine a beam direction and a polarization of a signal to be transmitted. Hereinafter, configurations of the base station 110 and the terminal 120 for determining a polarization of a transmission signal will be described with reference to FIGS. 2 to 4.

Figure 2:
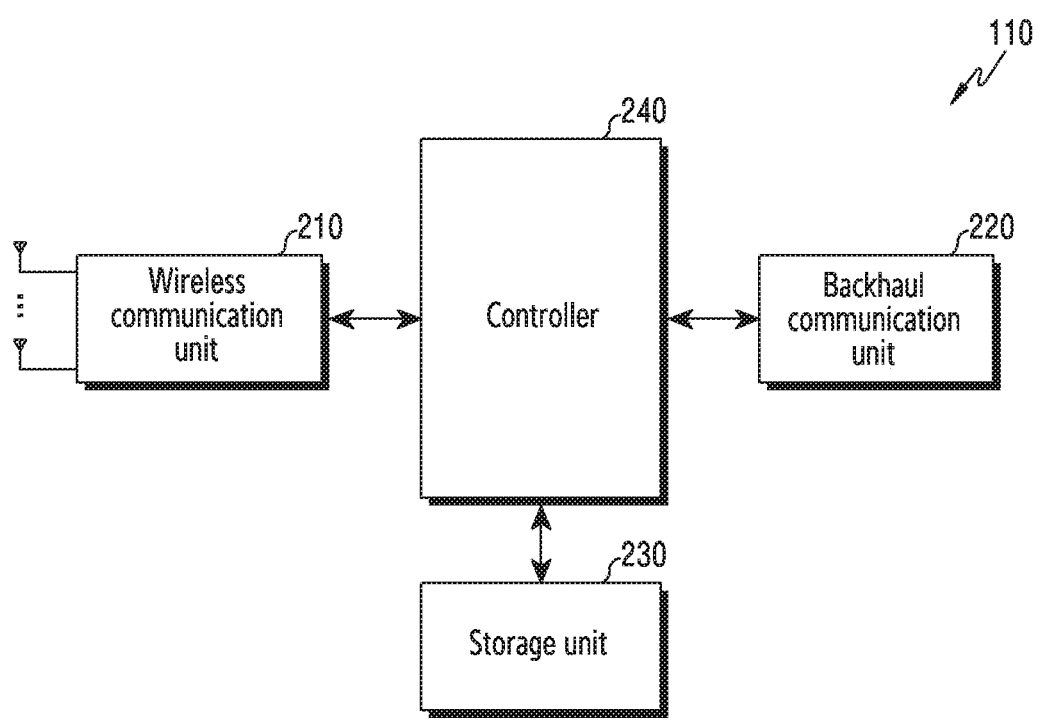
FIG. 2 illustrates a configuration of a base station in a wireless communication system according to various embodiments of the disclosure.

FIG. 2 illustrates a configuration of a base station in a wireless communication system according to various embodiments of the disclosure. The configuration illustrated in FIG. 2 may be understood as a configuration of the base station 110. The term " . . . unit", the term ending with the suffix " . . . or" or " . . . er", or the like, which is used below, may signify a unit of processing at least one function or operation, and this configuration may be implemented in hardware, software, or as a combination of hardware and software.

Referring to FIG. 2, the base station 110 may include a wireless communication unit 210, a backhaul communication unit 220, a storage unit 230, and a controller 240.

The wireless communication unit 210 is configured to perform functions for transmitting or receiving a signal through a wireless channel. For example, the wireless communication unit 210 is configured to perform a function of conversion between a baseband signal and a bit stream according to a physical layer standard of the system. For example, the wireless communication unit 210 is configured to, when data is transmitted, generate complex symbols by encoding and modulating a transmission bit stream. Also, the wireless communication unit 210 is configured to, when data is received, reconstruct a reception bit stream by demodulating and decoding a baseband signal. Further, the wireless communication unit 210 is configured to up-convert a baseband signal into a Radio Frequency (RF) band signal and then transmit the RF band signal through an antenna, and is configured to down-convert an RF band signal received through the antenna into a baseband signal.

To this end, the wireless communication unit 210 may include a transmission filter, a reception filter, an amplifier, a mixer, an oscillator, a Digital-to-Analog Converter (DAC), an Analog-to-Digital Converter (ADC), and the like. Also, the wireless communication unit 210 may include multiple transmission/reception paths. Further, the wireless communication unit 210 may include at least one antenna array including multiple antenna elements. The multiple antenna elements may be configured to provide two different polarizations. The two different polarizations may be a first polarization (e.g., a horizontal polarization) and a second polarization (e.g., a vertical polarization) orthogonal to the first polarization. In terms of hardware, the wireless communication unit 210 may include a digital unit and an analog unit, and the analog unit may include multiple sub-units according to operating power, an operating frequency, and the like.

As described above, the wireless communication unit 210 transmits and receives signals. Accordingly, the wireless communication unit 210 may be referred to as a "transmitter", a "receiver", or a "transceiver". Also, in the following description, transmission and reception performed through a wireless channel has a meaning including the execution of the above-described processing by the wireless communication unit 210.

According to various embodiments of the disclosure, during execution of beamforming, the wireless communication unit 210 may perform a search procedure in order to search for a combination of a beam and a polarization, which has good transmission performance or good reception performance. The wireless communication unit 210 may transmit multiple reference signals or multiple Synchronization Signals (SSs) (e.g., SS blocks). In the disclosure, an optimal reference signal may signify a reference signal having the highest channel quality among reference signals. That is, an optimal beam may signify a beam having the highest channel quality among beams. In the disclosure, a high channel quality may signify a case in which a signal magnitude-related channel quality value is large or an error rate-related channel quality value is small. In the disclosure, a channel quality may be at least one of, for example, Beam Reference Signal Received Power (BRSRP), Reference Signal Received Power (RSRP), Reference Signal Received Quality (RSRQ), Received Signal Strength Indicator (RSRI), Signal-to-Interference and Noise Ratio (SINR), Carrier-to-Interference and Noise Ratio (CINR), Signal-to-Noise Ratio (SNR), error vector magnitude (EVM), Bit Error Rate (BER), and Block Error Rate (BLER). In addition to the above-described examples, it goes without saying that other terms having equivalent technical meanings or other metrics representing a channel quality may be used.

Multiple reference signals may be transmitted after being beamformed, and thus may be referred to as "Beam Reference Signals (BRSs)" or "Beam Refinement Reference Signals (BRRSs)". The multiple reference signals may be signals obtained by performing beamforming on existing reference signals. For example, the reference signal may be one of a Cell-Specific Reference Signal (CRS), a Channel State Information-Reference Signal (CSI-RS), and a Demodulation-RS (DM-RS).

The backhaul communication unit 220 is configured to provide an interface configured to perform communication with other nodes within a network. That is, the backhaul communication unit 220 is configured to convert a bit stream transmitted from the base station 110 to another node, for example, another access node, another base station, a higher node, a core network, and the like, into a physical signal, and is configured to convert a physical signal received from another node into a bit stream.

The storage unit 230 is configured to store data, such as a basic program for operation of the base station 110, an application program, and configuration information. The storage unit 230 may be implemented by a volatile memory, a non-volatile memory, or a combination of a volatile memory and a non-volatile memory. Also, the storage unit 230 is configured to provide stored data in response to a request of the controller 240.

The controller 240 is configured to control an overall operation of the base station 110. For example, the controller 240 is configured to transmit and receive signals through the wireless communication unit 210 or through the backhaul communication unit 220. Also, the controller 240 is configured to record data in the storage unit 230 and read the recorded data therefrom. To this end, the controller 240 may include at least one processor.

According to various embodiments of the disclosure, the controller 240 may include a calculation unit configured to perform a calculation operation of configuring a resource identifier (resource ID) of each of multiple beams and a resource identifier (resource ID) of each of multiple polarizations (e.g., a first polarization and a second polarization). In this example, the calculation unit is an instruction set or code stored in the storage unit 230, and may be an instruction/code at least temporarily residing in the controller 240, a storage space configured to store the instruction/code, or a part of circuitry configuring the controller 240. According to a configuration, the calculation unit may perform the four fundamental arithmetic operations, such as adding a constant to a configured index or dividing the configured index by a constant, may perform calculation (e.g., a floor function) giving a maximum integer for a particular value, or may perform modulo (e.g., mod 2) calculation. Further, the controller 240 may control the base station 110 to perform operations according to various embodiments described below.

Figure 3:
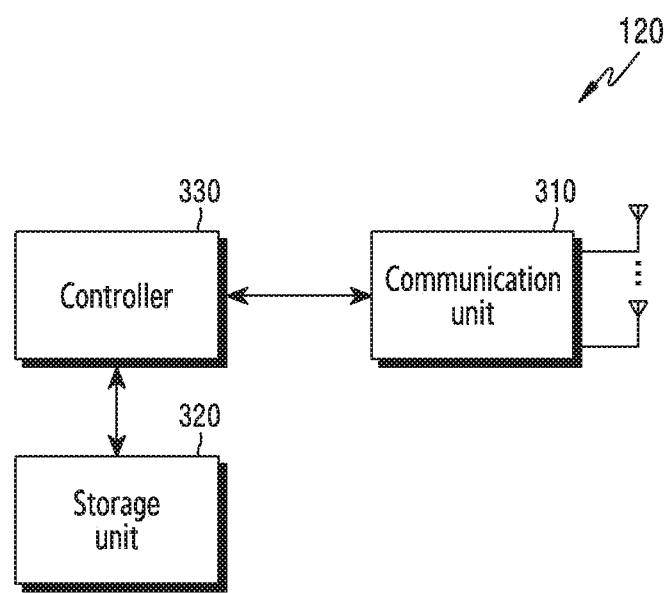
FIG. 3 illustrates a configuration of a terminal in a wireless communication system according to various embodiments of the disclosure.

FIG. 3 illustrates a configuration of a terminal in a wireless communication system according to various embodiments of the disclosure. The configuration illustrated in FIG. 3 may be understood as a configuration of the terminal 120. The term " . . . unit", the term ending with the suffix " . . . or" or " . . . er", or the like, which is used below, may signify a unit of processing at least one function or operation, and this configuration may be implemented in hardware, software, or as a combination of hardware and software.

Referring to FIG. 3, the terminal 120 includes a communication unit 310, a storage unit 320, and a controller 330.

The communication unit 310 is configured to perform functions for transmitting or receiving a signal through a wireless channel. For example, the communication unit 310 is configured to perform a function of conversion between a baseband signal and a bit stream according to a physical layer standard of the system. For example, the communication unit 310 is configured to, when data is transmitted, generate complex symbols by encoding and modulating a transmission bit stream. Also, the communication unit 310 is configured to, when data is received, reconstruct a reception bit stream by demodulating and decoding a baseband signal. Further, the communication unit 310 is configured to up-convert a baseband signal into an RF band signal and then transmit the RF band signal through an antenna, and is configured to down-convert an RF band signal received through the antenna into a baseband signal. For example, the communication unit 310 may include a transmission filter, a reception filter, an amplifier, a mixer, an oscillator, a DAC, an ADC, and the like.

Also, the communication unit 310 may include multiple transmission/reception paths. Further, the communication unit 310 may include at least one antenna array including multiple antenna elements. In terms of hardware, the communication unit 310 may include a digital circuitry and an analog circuitry (e.g., a Radio Frequency Integrated Circuit (RFIC)). In this example, the digital circuitry and the analog circuitry may be implemented as one package. Also, the communication unit 310 may include multiple RF chains. Further, the communication unit 310 may perform beamforming.

Also, the communication unit 310 may include different communication modules configured to process signals in different frequency bands. Further, the communication unit 310 may include multiple communication modules configured to support multiple different radio access technologies. For example, different radio access technologies may include Bluetooth Low Energy (BLE), Wi-Fi, Wi-Fi Gigabyte (WiGig), a cellular network (e.g., a Long-Term Evolution (LTE) network), and the like. Also, different frequency bands may include a Super-High Frequency (SHF) (e.g., 2.5 GHz or 5 GHz) band, a millimeter wave (mm-Wave) (e.g., 60 GHz) band, and the like.

As described above, the communication unit 310 transmits and receives signals. Accordingly, the communication unit 310 may be referred to as a "transmitter", a "receiver", or a "transceiver". Also, in the following description, transmission and reception performed through a wireless channel has a meaning including the execution of the above-described processing by the communication unit 310. According to various embodiments of the disclosure, the communication unit 310 may receive multiple reference signals. The reference signals may be transmitted using different beams and different polarizations.

The storage unit 320 is configured to store data, such as a basic program for operation of the terminal 120, an application program, and configuration information. The storage unit 320 may be implemented by a volatile memory, a non-volatile memory, or a combination of a volatile memory and a non-volatile memory. Also, the storage unit 320 is configured to provide stored data in response to a request of the controller 330. In some embodiments, the storage unit 320 may include information on codes. The codes may be orthogonal to each other. Each of the codes may represent a polarization of a reference signal transmitted by a base station.

The controller 330 is configured to control an overall operation of the terminal 120. For example, the controller 330 is configured to transmit and receive signals through the communication unit 310. Also, the controller 330 is configured to record data in the storage unit 320 and read the recorded data therefrom. To this end, the controller 330 may include at least one processor or a microprocessor, or may be part of a processor. In addition, the controller 330 and a part of the communication unit 310 may be referred to as a "Communication Processor (CP)". In particular, according to various embodiments, the controller 330 may include a measurement calculation unit configured to calculate a parameter of each of multiple reference signals received by the communication unit 310. The parameter may be a parameter of a received signal such as RSRI, RSRQ, or RSRP, or may be at least one of SINR, CINR, Signal-to-Noise Ratio (SNR), EVM, BER, and BLER. The measurement calculation unit may calculate a maximum value through comparison calculation, or may perform calculation for determining a particular parameter. Further, the controller 330 may control the terminal 120 to perform operations according to various embodiments described below.

Figure 4A:
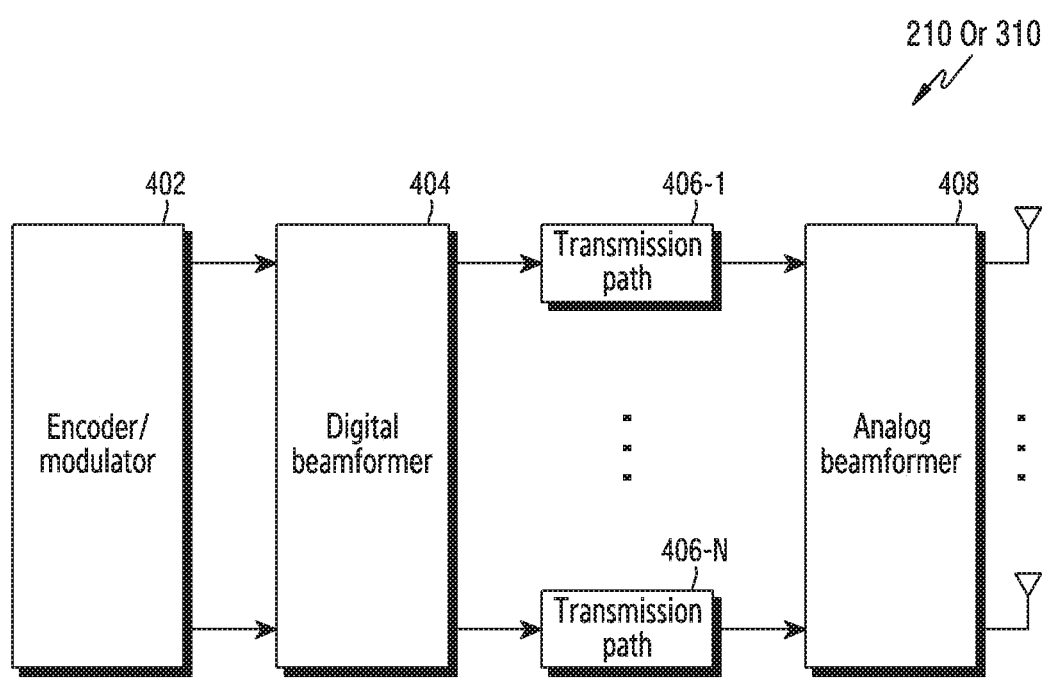
FIGS. 4A to 4C each illustrate a configuration of a communication unit in a wireless communication system according to various embodiments of the disclosure.
Figure 4B:
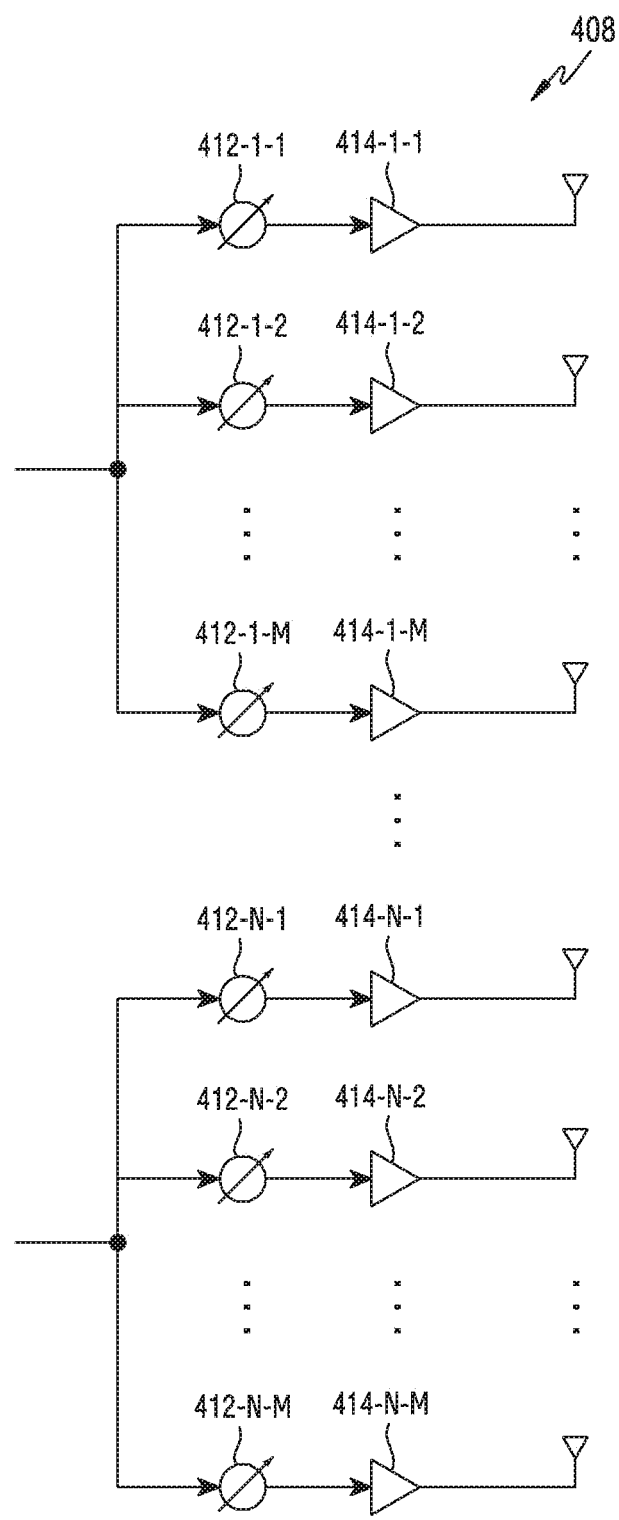
Figure 4C:
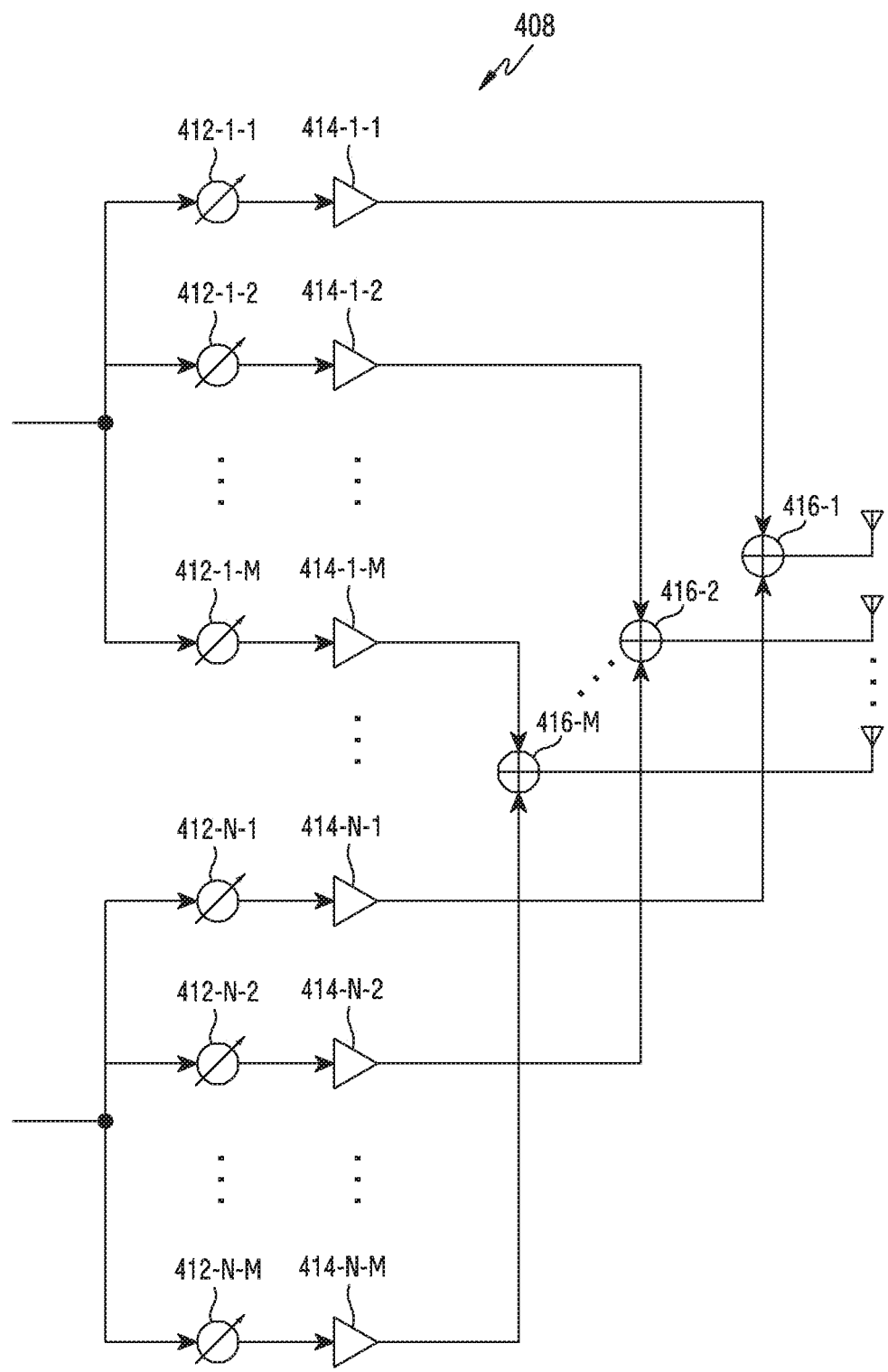

FIGS. 4A to 4C each illustrate a configuration of a communication unit in a wireless communication system according to various embodiments of the disclosure. FIGS. 4A to 4C each illustrate an example of a specific configuration of the communication 210 of FIG. 2 or the communication unit 310 of FIG. 3. Specifically, FIGS. 4A to 4C each illustrate a part of the communication 210 of FIG. 2 or the communication unit 310 of FIG. 3, and illustrate examples of elements configured to perform beamforming.

Referring to FIG. 4A, the communication unit 210 or 310 includes an encoder/modulator 402, a digital beamformer 404, multiple transmission paths 406-1 to 406-N, and an analog beamformer 408.

The encoder/modulator 402 performs channel encoding. For channel encoding, at least one of a Low-Density Parity-Check (LDPC) code, a convolution code, and a polar code may be used. The encoder/modulator 402 generates modulation symbols by performing constellation mapping.

The digital beamformer 404 performs beamforming on a digital signal (e.g., modulation symbols). To this end, the digital beamformer 404 multiplies the modulation symbols by beamforming weights. In this example, the beamforming weights may be used to change the magnitude and phrase of the signal, and may be referred to as a "precoding matrix" or a "precoder". The digital beamformer 404 outputs the digitally beamformed modulation symbols to the multiple transmission paths 406-1 to 406-N. In this example, according to a Multiple-Input Multiple-Output (MIMO) transmission scheme, the modulation symbols may be multiplexed, or the same modulation symbols may be provided to the multiple transmission paths 406-1 to 406-N.

The multiple transmission paths 406-1 to 406-N convert the digitally beamformed digital signals into analog signals. To this end, each of the multiple transmission paths 406-1 to 406-N may include an Inverse Fast Fourier Transform (IFFT) calculation unit, a Cyclic-Prefix (CP) inserter, a DAC, and an up-converter. The CP inserter is for an Orthogonal Frequency Division Multiplexing (OFDM) scheme, and may be omitted when another physical layer scheme (e.g., a Filter Bank Multi-Carrier (FBMC)) is applied. That is, the multiple transmission paths 406-1 to 406-N provide independent signal processing processes for multiple streams generated through the digital beamforming. However, according to an implementation scheme, some of the elements of the multiple transmission paths 406-1 to 406-N may be used in common.

The analog beamformer 408 performs beamforming on analog signals. To this end, the digital beamformer 404 multiplies the analog signals by beamforming weights. In this example, the beamforming weights are used to change the magnitude and phrase of the signal. Specifically, according to a connection structure between the multiple transmission paths 406-1 to 406-N and antennas, the analog beamformer 408 may be configured as illustrated in FIG. 4B or FIG. 4C.

Referring to FIG. 4B, signals input to the analog beamformer 408 are processed with operations of phase/magnitude conversion and amplification, and then transmitted through the antennas. In this example, the signals of the respective paths are transmitted through different antenna sets, that is, antenna arrays. As to the processing of a signal input through a first path, the signal is converted into a signal stream having the same or different phases/magnitudes by the phase/magnitude converters 412-1-1 to 412-1-M, amplified by the amplifiers 414-1-1 to 414-1-M, and then transmitted through the antennas.

Referring to FIG. 4C, signals input to the analog beamformer 408 are processed with operations of phase/magnitude conversion and amplification, and then transmitted through the antennas. At this example, the signals of the respective paths are transmitted through the same antenna set, that is, the antenna array. As to the processing of a signal input through a first path, the signal is converted into a signal stream having the same or different phases/magnitudes by the phase/magnitude converters 412-1-1 to 412-1-M and amplified by the amplifiers 414-1-1 to 414-1-M. Then, so as to be transmitted through one antenna array, the amplified signals are added by the adders 416-1-1 to 416-1-M with reference to the antenna elements, and then transmitted through the antennas.

FIG. 4B illustrates an example in which an independent antenna array is used for each transmission path, and FIG. 4C illustrates an example in which transmission paths share one antenna array. However, according to another embodiment, some transmission paths may use independent antenna arrays, and the remaining transmission paths may share one antenna array. Further, according to still another embodiment, a structure that may adaptively change depending on a situation may be used by applying a switchable structure between the transmission paths and the antenna arrays.

The structures of the base station 110 and the terminal 120 configured to consider a polarization as well as a beam direction have been described with reference to FIGS. 2 to 4. Hereinafter, an operation of transmitting multiple reference signals in order to determine a beam direction and a polarization of data to be transmitted will be described with reference to FIGS. 5 to 7.

Figure 5:
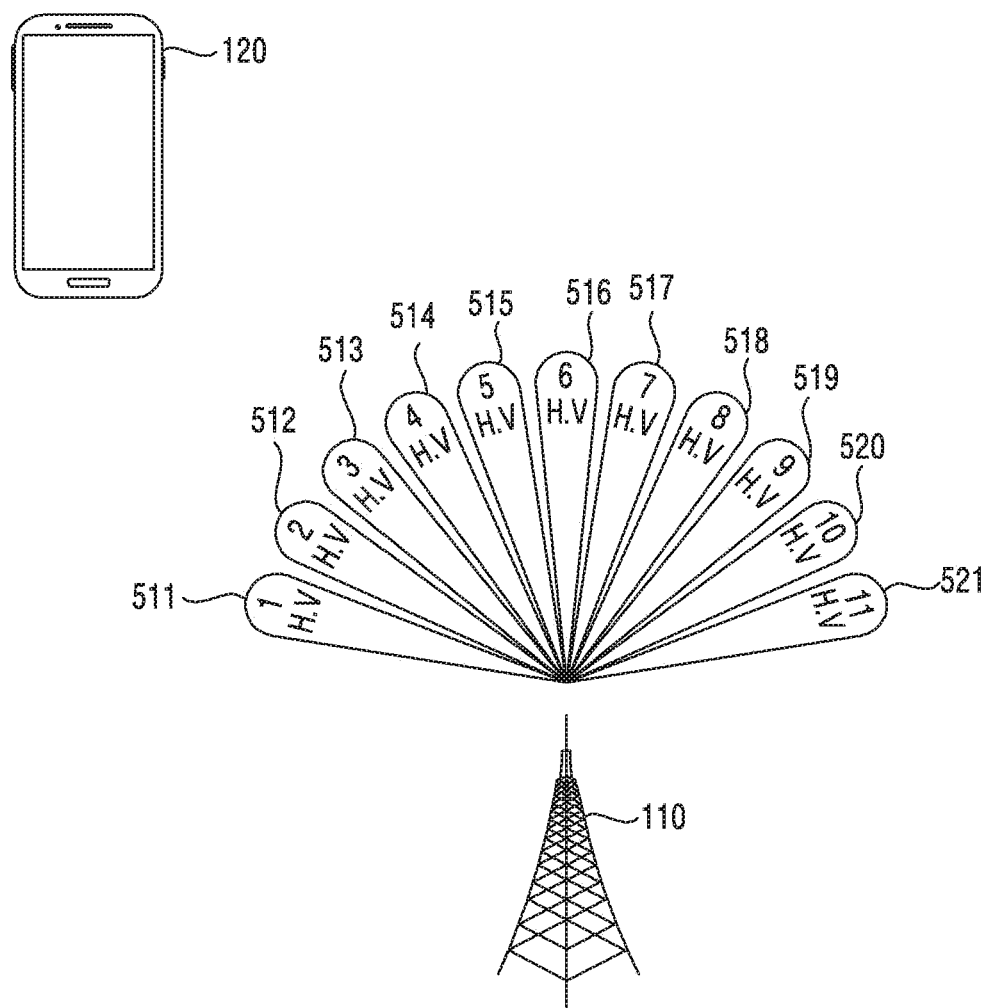
FIG. 5 illustrates an example of transmitting a reference signal according to various embodiments of the disclosure.

FIG. 5 illustrates an example of transmitting a reference signal according to various embodiments of the disclosure.

Referring to FIG. 5, the base station 110 may transmit multiple reference signals. The multiple reference signals may include multiple first reference signals and multiple second reference signals.

The multiple first reference signals may correspond to multiple beams, respectively. The multiple beams may include beams 511, 512, 513, 514, 515, 516, 517, 518, 519, 520, and 521. Referring to FIG. 5, a description is made with reference to 11 beams, but the disclosure is not limited thereto. The following description can be applied to more than or less than 11 beams. Each of the multiple first reference signals may be a reference signal to which a first polarization is applied. The first polarization may be a horizontal polarization. An electromagnetic wave of each of the multiple first reference signals may include an electric wave in a direction parallel to the ground.

The multiple second reference signals may correspond to the multiple beams, respectively. Each of the multiple second reference signals may be a reference signal to which a second polarization is applied. The second polarization may be a vertical polarization. An electromagnetic wave of each of the multiple second reference signals may include an electromagnetic wave in a direction vertical to the ground.

The base station 110 may transmit the multiple first reference signals and multiple second reference signals to the terminal 120. The base station 110 may transmit a total of 22 (=2×11) reference signals. In other words, the base station 110 may transmit a reference signal for each of 22 combinations of polarizations and beams determined on the basis of two polarizations and 11 beams.

In some embodiments, the base station 110 may sequentially transmit the multiple first reference signals and the multiple second reference signals with reference to the polarizations. Specifically, the base station 110 may transmit the multiple first reference signals to the terminal 120, and may then transmit the multiple second reference signals to the terminal 120.

In some other embodiments, the base station 110 may sequentially transmit the multiple first reference signal and the multiple second reference signals with reference to the beams. Specifically, the base station 110 may transmit a reference signal corresponding to the beam 511 among the multiple first reference signals, and may transmit a reference signal corresponding to the beam 511 among the multiple second reference signals. Thereafter, the base station 110 may transmit a reference signal corresponding to the beam 512 among the multiple first reference signals, and may transmit a reference signal corresponding to the beam 512 among the multiple second reference signals. As described above, the base station 110 may transmit a reference signal corresponding to the first polarization for each of all the beams up to the beam 521, and may transmit a reference signal corresponding to the second polarization for each of all the beams up to the beam 521. In this example, an order of the beams is not limited to a particular direction, such as the clockwise direction. The order of the beams may be arbitrarily determined.

In still some other embodiments, the base station 110 may transmit the multiple first reference signals and the multiple second reference signals with reference to the beams. Specifically, the base station 110 may simultaneously transmit a reference signal corresponding to the first polarization of the same beam and a reference signal corresponding to the second polarization of the same beam. In the same time-frequency resource, different covering codes may be used to distinguish a reference signal corresponding to the first polarization from a reference signal corresponding to the second polarization. The base station 110 may transmit a total of 22 reference signals through 11 time resource units from the beam 511 to the beam 521. A corresponding embodiment will be described in detail below with reference to FIGS. 8 to 10.

Although a beam direction coincides with the terminal, a reception gain related to a combination of another beam direction and a particular polarization may be higher according to the difference between the polarizations. Therefore, it is profitable for the base station 110 to transmit respective reference signals with different polarizations in relation to all the beams in order to determine an optimal combination of a beam and a polarization. The base station 110 does not receive feedback with respect to only a particular beam by transmitting only a reference signal for each of the beams, but receives feedback with respect to not only a particular beam but also a particular polarization by transmitting more reference signals with different polarizations, and thus may determine an optimal combination of a beam and a polarization.

Figure 6:
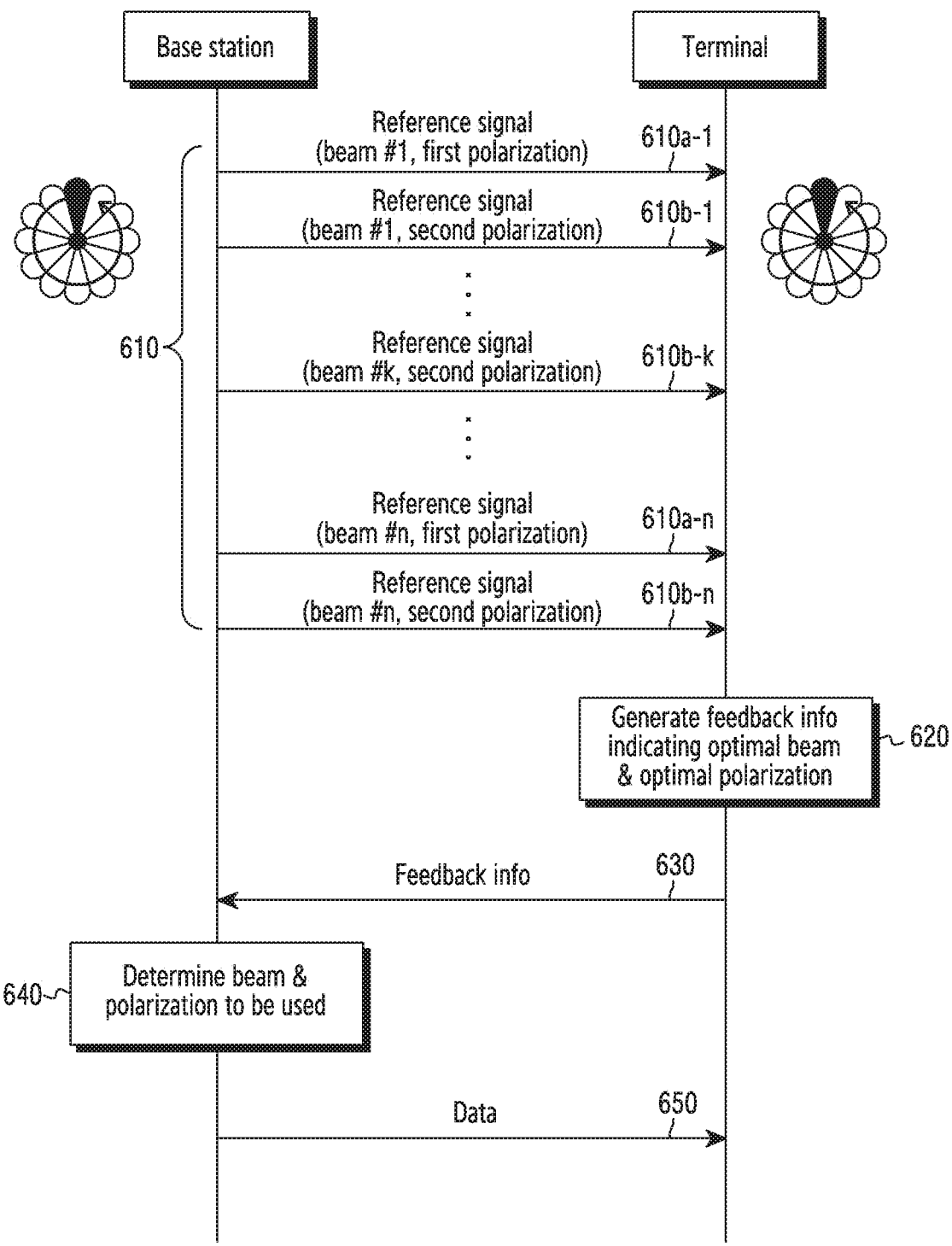
FIG. 6 illustrates an example of a beam and polarization search procedure according to various embodiments.

FIG. 6 illustrates an example of a beam and polarization search procedure according to various embodiments. Through the beam and polarization search procedure, a base station transmits multiple reference signals in order to find an optimal combination of a beam and a polarization. The multiple reference signals may have different combinations of beams and polarizations. For example, when the number of beams supportable by the base station is n and the number of polarizations supportable by the base station is 2, the number of combinations of the beams and the polarizations may be a total of 2n. Hereinafter, referring to FIG. 6, a description will be made with reference to a downlink, but the disclosure is not limited thereto. That is, a terminal may also perform uplink communication in order to find an optimal combination of a beam and a polarization.

Referring to FIG. 6, in operation 610, the base station 110 may transmit multiple reference signals to the terminal 120. The multiple reference signals may include: multiple first reference signals corresponding to a first polarization and multiple beams; and multiple second reference signals corresponding to a second polarization and the multiple beams.

Specifically, in operation 610a-1, the base station 110 may transmit a first reference signal to the terminal 120. The first reference signal is a reference signal corresponding to beam #1 and the first polarization among the multiple beams. A resource region, in which the first reference signal is transmitted, may be referred to as "resource identifier (resource ID) #1". The resource ID may be a resource differentiation factor of a reference signal transmitted through beamforming defined between the base station 110 and the terminal 120. In other words, the resource ID may be an identifier for identifying of a resource region including a beamformed reference signal. For example, a unit of the resource region may be at least one subframe. The resource ID may be referred to as a "Beam Reference Signal resource Identifier (BRS resource ID)". When a signal, for which a resource ID is differently configured, is transmitted, the terminal 120 may identify a relevant beam (polarization) as another beam (or another polarization), and thus may receive the signal.

In operation 610b-1, the base station 110 may transmit a second reference signal to the terminal 120. The second reference signal is a reference signal corresponding to beam #1 and the second polarization among the multiple beams. A resource region, in which the second reference signal is transmitted, may be referred to as "resource ID #2".

As in operations 610a-1 and 610b-1, the base station 110 may transmit a reference signal corresponding to the first polarization and a reference signal corresponding to the second polarization with respect to all of the multiple beams. For example, in operation 610b-k, the base station may transmit a 2k-th reference signal to the terminal 120. The 2k-th reference signal is a reference signal corresponding to beam #k and the second polarization among the multiple beams. A resource region, in which the 2k-th reference signal is transmitted, may be referred to as "resource ID #2k".

In operation 610a-n, the base station 110 may transmit a (2n-1)-th reference signal to the terminal 120. The (2n-1)-th reference signal is a reference signal corresponding to beam #n and the first polarization among the multiple beams. A resource region, in which the (2n-1)-th reference signal is transmitted, may be referred to "resource ID #2n-1".

In operation 610*b*-*n*, the base station 110 may transmit a 2n-th reference signal to the terminal 120. The 2n-th reference signal is a reference signal corresponding to beam #n and the second polarization among the multiple beams. A resource region, in which the 2n-th reference signal is transmitted, may be referred to as "resource ID #2n".

In consideration of the above-described operations, an x-th reference signal transmitted through resource ID #x may be generalized as follows. When x is an odd number, the x-th reference signal may be a reference signal transmitted using a $$\lfloor \frac{x}{2} \rfloor$$

-th beam (in this example, [x] is a floor function and represents a maximum integer which is not greater than x) and a first polarization. When x is an even number, the x-th reference signal may be a reference signal transmitted using an $$\frac{x}{2}$$

-th beam and a second polarization. For convenience of description, both a number of a beam and a number of a reference signal are sequentially numbered, but may be numbered in an arbitrary order. Further, a resource ID may be numbered from 0.

In operation 620, the terminal 120 may feed, back to the base station 110, information on an optimal reference signal among the multiple reference signals received from the base station 110. The terminal 120 may determine an optimal reference signal by using a parameter of each of the multiple reference signals. In some embodiments, the parameter may represent the quality of a received reference signal. For example, the parameter may be RSRP, RSRQ, or RSSI. In some other embodiments, the parameter may include information related to noise and interference through a beam and a polarization. For example, the parameter may be SNR, CINR, SINR, or Signal-to-Interference Ratio (SIR). In still some other embodiments, the parameter may be related to an error rate of a signal through a beam and a polarization. For example, the parameter may be EVM, BER, or BLER.

The terminal 120 may determine an optimal reference signal corresponding to the largest parameter value among respective parameter (e.g., RSRP) values of the multiple reference signals. The terminal 120 may acquire a resource ID corresponding to the determined optimal reference signal. For example, the resource ID may be #p. The terminal 120 may generate feedback information indicating a resource ID of the optimal reference signal. In this example, the terminal 120 may not recognize an actual physical direction of a beam corresponding to the optimal reference signal. Similarly, the terminal 120 may not recognize an actual direction of a polarization corresponding to the optimal reference signal. The terminal 120 only shares information on each of the multiple reference signals with the base station 110 through the resource IDs, and may not recognize a position of a direction and an actual direction of a polarization in an actual physical environment. Instead, the terminal 120 may transmit, to the base station 110, feedback information indicating a resource region (e.g., resource ID #p) corresponding to the optimal reference signal, and thus may deliver, to the base station 110, information indicating the optimal reference signal.

In operation 630, the terminal 120 may deliver the generated feedback information to the base station 110 through the resource region corresponding to resource ID #p. The base station 110 may receive the feedback information from the terminal 120.

In operation 640, the base station 110 may acquire information on the optimal reference signal, from the resource region indicated by the feedback information. The base station 110 has assigned a resource region to each of the multiple reference signals, and may determine a beam and a polarization corresponding to the optimal reference signal. For example, the base station 110 may receive the feedback information indicating resource ID #p. When p is an odd number, the base station 110 may determine that the optimal reference signal has been transmitted through a $$\frac{p}{2}$$

-th beam and the first polarization. When p is an even number, the base station 110 may determine that the optimal reference signal has been transmitted through a $$\lfloor \frac{p}{2} \rfloor$$

-th beam and the second polarization.

An orientation direction of a beam corresponding to the optimal reference signal corresponds to a direction in which the terminal 120 is located. A polarization corresponding to the optimal reference signal may have a direction which coincides with that of a polarization of the antenna 125 of the terminal 120, or may have a direction parallel to a boundary surface of a building including the terminal 120.

In operation 650, the base station 110 may transmit data according to a combination of the beam and the polarization corresponding to the optimal reference signal. Specifically, the base station 110 may control a parameter (e.g., precoding) for digital beamforming or a parameter (e.g., an antenna phase value) for analog beamforming to transmit the data through the beam corresponding to the optimal reference signal. For example, the base station 110 may apply the polarization corresponding to the optimal reference signal through a $W_1$ precoder representing a short-term characteristic, may determine a direction of the beam corresponding to the optimal reference signal through a $W_2$ precoder representing a long-term characteristic, and may transmit data to the terminal 120.

The base station 110 may control an antenna included in the base station 110 to transmit the data with the polarization corresponding to the optimal reference signal. For example, the base station 110 may control the antenna 115 to transmit the data through the dipole antenna 130 configured to generate the first polarization within the antenna 115.

Figure 7:
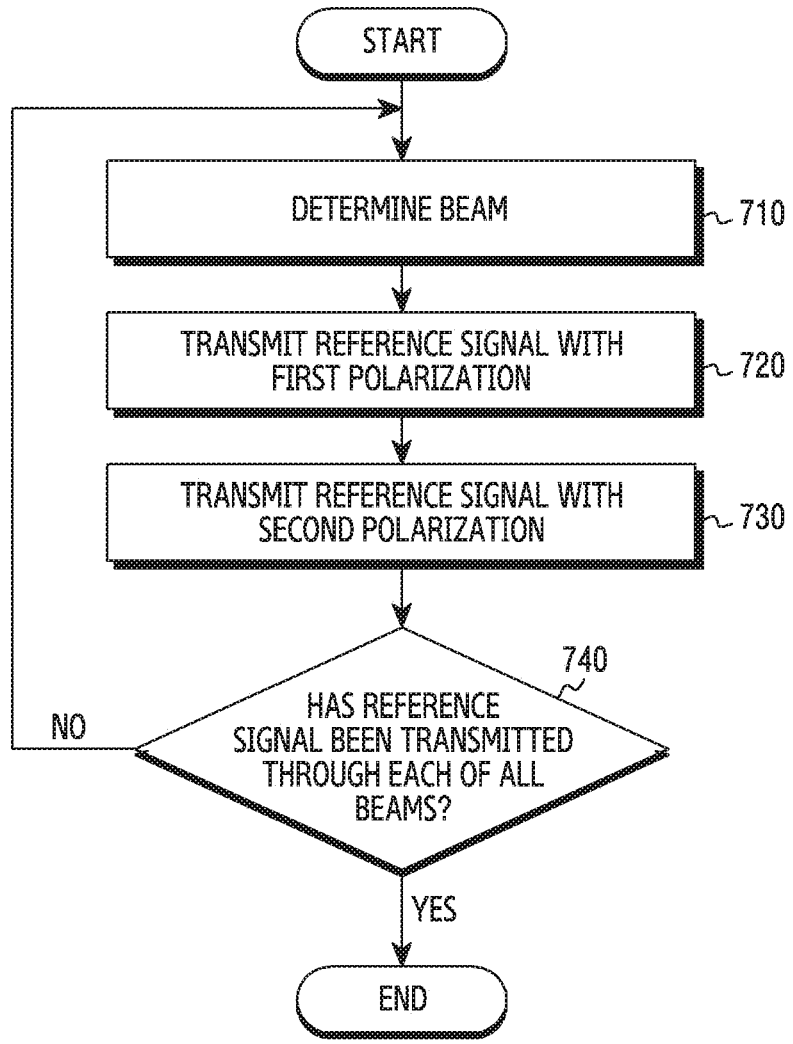
FIG. 7 illustrates a flowchart of a beam and polarization search procedure by a base station according to various embodiments of the disclosure.

FIG. 7 illustrates a flowchart of a beam and polarization search procedure by a base station according to various embodiments of the disclosure. The base station may be the base station 110 of FIG. 1. FIG. 7 may correspond to operations 610*a*-1 to 610*b*-*n* of FIG. 6.

Referring to FIG. 7, in operation 710, the base station 110 may determine a beam direction. The base station 110 may determine any beam among beam candidates. The beam candidates signify beams in directions in which reference signals are not yet transmitted. The number of the beam candidates may be less than or equal to that of beams supportable by the base station 110. For example, when reference signals of a first polarization and reference signals of a second polarization are transmitted through the beams 511, 513, 515, and 517 among the beams of FIG. 5, the beam candidates may include the beams 512, 514, 516, 518, 519, 520, and 521. The base station 110 may determine a beam direction corresponding to the beam 512.

In operation 720, the base station 110 may transmit a reference signal with the first polarization in the determined beam direction. For example, the base station 110 may transmit a reference signal of a horizontal polarization through the beam 512.

In operation 730, the base station 110 may transmit a reference signal with the second polarization in the determined beam direction. The second polarization may be a polarization orthogonal to the first polarization in operation 720. For example, the base station 110 may transmit a reference signal of a vertical polarization through the beam 512. The base station 110 may transmit a reference of a vertical polarization through the beam 512, and may then exclude the beam 512 from the beam candidates.

In operation 740, the base station 110 may determine whether a reference signal has been transmitted through each of all the beams. All the beams may signify beams supportable by the base station 110. In some embodiments, the base station 110 may determine whether a reference signal has been transmitted through each of all the beams, on the basis of whether the number of the beam candidates is 0. When the number of the beam candidates is 0, there is no direction of a beam that the base station 110 may determine in operation 710, and thus the base station 110 may terminate an operation of transmitting a reference signal. In some other embodiments, the base station 110 may determine whether a reference signal has been transmitted through each of all the beams, on the basis of a resource ID. For example, when a resource region of the reference signal transmitted with the second polarization in operation 730, which is the previous operation of operation 740, corresponds to resource ID #22, the base station 110 may determine that a reference signal has been transmitted through each of all the beams. This is because the number of combinations of beams and polarizations is 22 and therefore, 22 resource regions for transmissions of reference signals are needed. If the base station 110 uses all the beam resources, even when the base station 110 returns to operation 710, there is no resource on which a reference signal is to be transmitted in operations 720 and 730, and thus the base station 110 may terminate an operation of transmitting a reference signal.

When it is determined that a reference signal has been transmitted through each of all the beams, the base station 110 may return to operation 710, and may repeatedly perform operations 710 to 730.

In FIGS. 5 to 7, the base station 110 transmits reference signals with different polarizations, and thus transmits reference signals on twice as many time resources (e.g., subframes) as in an operation of transmitting respective reference signals corresponding to beams. However, in order to reduce time necessary to perform the beam and polarization search procedure, a method for transmitting reference signals of different polarizations on the same time resource may be required. Hereinafter, an operation of transmitting reference signals representing different polarizations by using a covering code will be described with reference to FIGS. 8 to 10.

Figure 8:
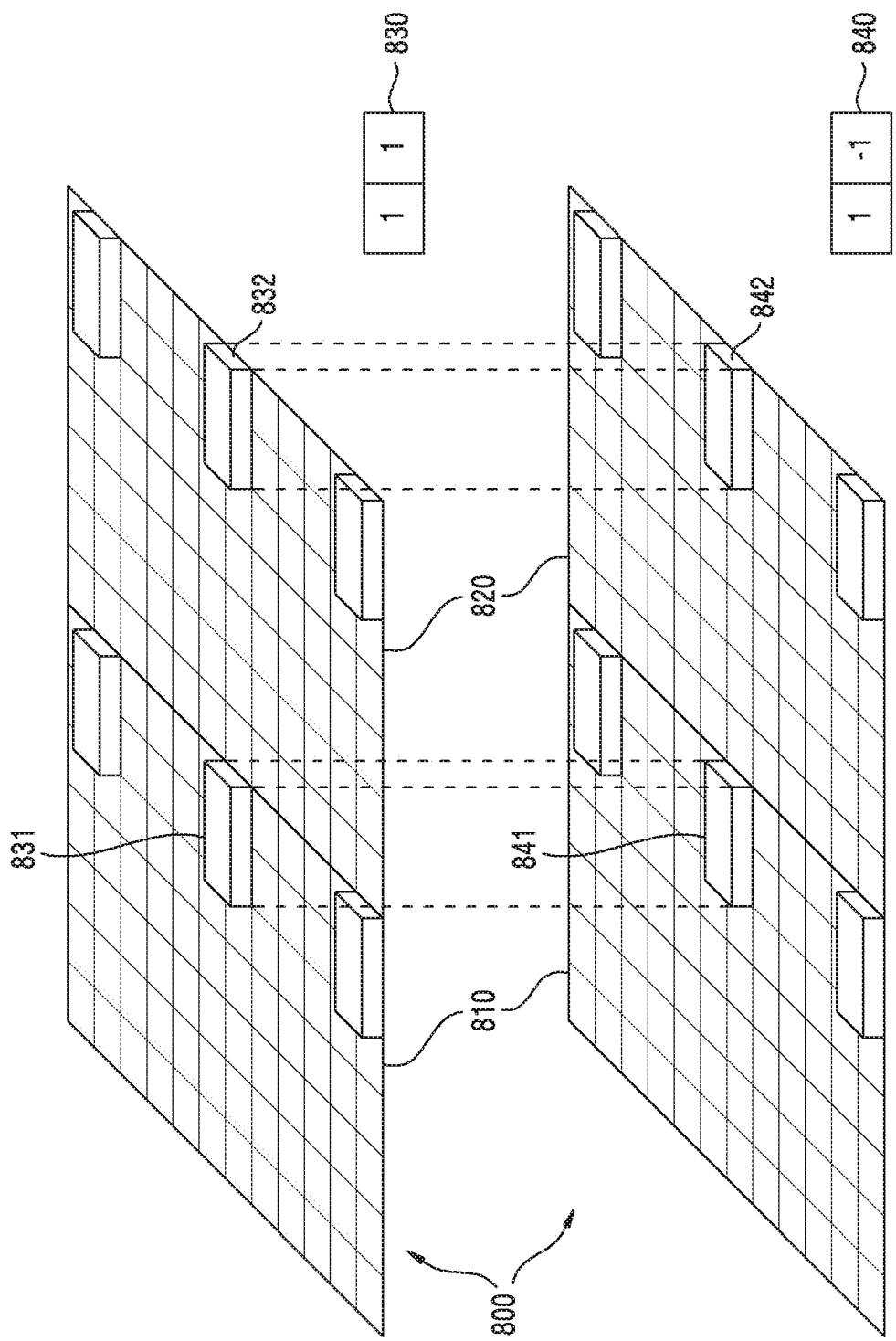
FIG. 8 illustrates an example of applying a covering code to symbols of a reference signal according to various embodiments of the disclosure.

FIG. 8 illustrates an example of applying a covering code to symbols of a reference signal according to various embodiments of the disclosure. Referring to FIG. 8, a description will be described with reference to a subframe of LTE, but the disclosure is not necessarily limited thereto. The following description may also be applied to different types of resource units, according to radio access technology (RAT) employed in a wireless communication system.

Referring to FIG. 8, a subframe 800 may include two slots. The subframe 800 may include a Resource Block (RB) 810 and an RB 820 corresponding to each slot. In each RB, a horizontal axis represents a time resource, and a vertical axis represents a frequency resource.

The base station 110 may distinguish a first reference signal representing a first polarization from a second reference signal representing a second polarization, by using covering codes. In this example, "the first reference signal representing the first polarization" may signify "the first reference signal indicating being transmitted with the first polarization". The covering codes may include a first covering code 830 and a second covering code 840. The base station 110 may apply the first covering code 830 so as to generate symbols of the first reference signal. The base station 110 may apply the second covering code 840 so as to generate symbols of the second reference signal. The base station 110 may transmit the first reference signal and the second reference signal in the subframe 800. Two reference signals may be transmitted in the same subframe. Two reference signals are transmitted on the same time-frequency resource, but interference between the two reference signals can be eliminated by covering codes. To this end, the covering codes, that is, the first covering code 830 and the second covering code 840, may be defined to be orthogonal to each other. Various types of orthogonal sequences may be used as covering codes. For example, orthogonal sequences, such as Walsh codes, DFT coefficients, and CAZAC sequences, may also be used as covering codes. For example, each of the first covering code 830 and the second covering code 840 may be an Orthogonal Cover Code (OCC) having a length of 2. As an example, the first covering code 830 may be [1 1]. The second covering code 840 may be [1 −1]. Among a symbol pair 831, the base station 110 may multiply a first symbol by 1 and may multiply a second symbol by 1. Among a symbol pair 841, the base station 110 may multiply a first symbol by 1 and may multiply a second symbol by −1.

In FIG. 8, an OCC having a length of 2 is illustrated as being applied to consecutive symbols, but the disclosure is not necessarily limited thereto. Although not illustrated in FIG. 8, in some embodiments, the base station 110 may distinguish between two different polarizations by using OCCs each having a length of 4. The base station 110 may generate symbols of the first reference signal by applying a value of a first OCC having a length of 4 to the symbol pair 831 and the symbol pair 832. The base station 110 may generate symbols of the second reference signal by applying a value of a second OCC having a length of 4 to the symbol pair 841 and the symbol pair 842.

An OCC having a length of 4 may be used to identify four types of symbols. Therefore, the base station 110 may use the OCC having a length of 4 to distinguish between four reference signals (e.g., a combination of a first antenna port and the first polarization, a combination of the first antenna port and the second polarization, a combination of a second antenna port and the first polarization, and a combination of the second antenna port and the second polarization) derived from two antenna ports and two polarizations. In other words, the base station 110 may use a part of an OCC used to identify an antenna port of the base station 110 in order to indicate the polarization information (whether a relevant polarization is the first polarization or the second polarization). As described above, symbols, to which an OCC is applied, do not have to be necessarily consecutive symbols in an RB, or the length of the OCC applied to the symbols does not have to be 2.

The base station 110 may apply an OCC, and thus may transmit reference signals in the same beam direction at once on the same resource. The term "transmit reference signals at once" means that the reference signals are transmitted through one resource unit, which is a resource allocation unit, in an overlapping manner. The base station 110 may transmit the first reference signal corresponding to the first polarization and the second reference signal corresponding to the second polarization through one resource unit by using the same beam. The base station 110 may transmit at least two reference signals on a resource indicated by one resource ID. Therefore, when an OCC is applied, if the base station 110 supports n beams, the base station 110 may transmit all reference signals in only n resource regions (n resource IDs).

The terminal 120 may distinguish between reference signals transmitted with different polarizations, by using covering codes shared with the base station 110. For example, the terminal 120 may receive reference signals in a resource region corresponding to resource ID #3. The terminal 120 may decode the received reference signals by using the first covering code 830 and the second covering code 840, respectively. The terminal 120 may detect the first reference signal transmitted with the first polarization by using [1 1] which is the first covering code 830. The terminal 120 may detect the second reference signal transmitted with the second polarization by using [1 −1] which is the second covering code 840. In this example, the terminal 120 may pre-share covering codes with the base station 110.

When a received subframe is resource ID #e, the terminal 120 may receive a first reference signal and a second reference signal transmitted through an e-th beam. The first reference signal corresponds to the first polarization, and the second reference signal corresponds to the second polarization. The terminal 120 may receive a first reference signal and a second reference signal from the base station 110 through each of all beams. Thereafter, the terminal 120 may transmit feedback information indicating an optimal reference signal to the base station 110.

The base station 110 may identify a beam used to transmit an optimal reference signal, from a resource region indicated by the feedback information. For example, when a resource region indicated by the feedback information is resource ID #g, the base station 110 may identify that the optimal reference signal is a g-th beam among multiple beams. In this example, differently from FIGS. 5 to 7, the base station 110 may not know a polarization corresponding to the optimal reference signal through only the resource region indicated by the feedback information received from the terminal 120. The resource region indicated by the feedback information represents only information on a beam. Since the same beam only signifies the same resource ID, the terminal 120 may be required to transmit information indicating a polarization used to transmit the optimal reference signal (hereinafter "polarization information") to the base station 110.

In some embodiments, the terminal 120 may explicitly transmit polarization information to the base station 110. For example, the terminal 120 may include the polarization information in feedback information, and may transmit the feedback information including the polarization information to the base station 110. As an example, the polarization information is a one-bit field. When a value of the one bit is 0, the value of 0 may represent a first polarization (e.g., a horizontal polarization), and when the value of the one bit is 1, the value of 1 may represent a second polarization (e.g., a vertical polarization). In other words, the one-bit field may represent an index of a covering code applied to the optimal reference signal. As another example, separately from the feedback information, the terminal 120 may transmit the polarization information to the base station 110. The terminal 120 may transmit the polarization information, separately from the feedback information, and thus may more accurately deliver, to the base station 110, information on a polarization used to transmit the optimal reference signal.

In some other embodiments, the terminal 120 may implicitly transmit the polarization information to the base station 110. For example, the terminal 120 may adjust a timing, at which the terminal 120 transmits the feedback information to the base station 110, so as to deliver the polarization information to the base station 110. The terminal 120 may adjust the timing for transmission of the feedback information, in the appointed range. Thereafter, for example, when an optimal reference signal is transmitted with the first polarization, the terminal 120 may transmit the feedback information after an offset in a first range. When an optimal reference signal is transmitted with the second polarization, the terminal 120 may transmit the feedback information after an offset in a second range. In this example, the base station 110 and the terminal 120 may mutually share information on the first range and the second range.

Figure 9:
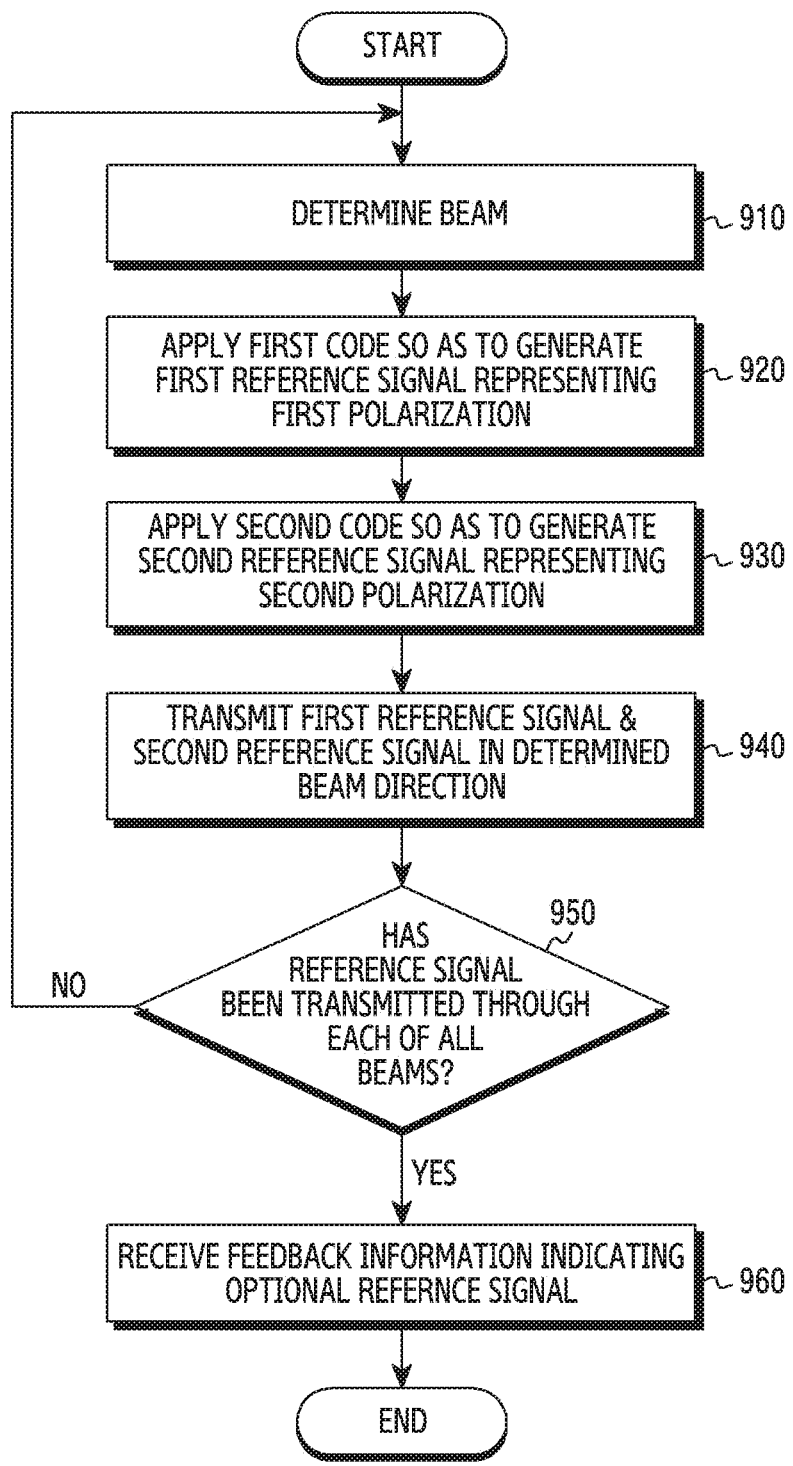
FIG. 9 illustrates a flowchart of a beam and polarization search procedure using a covering code in a base station according to various embodiments of the disclosure.

FIG. 9 illustrates a flowchart of a beam and polarization search procedure using a covering code in a base station according to various embodiments of the disclosure. The base station may be the base station 110 of FIG. 1.

In operation 910, the base station 110 may determine a beam direction. Operation 910 may correspond to operation 710 of FIG. 7.

In operation 920, the base station 110 may apply a first code so as to generate a first reference signal representing a first polarization. In operation 930, the base station 110 may apply a second code so as to generate a second reference signal representing a second polarization. The second polarization may be orthogonal to the first polarization. For example, the first polarization may be a horizontal polarization, and the second polarization may be a vertical polarization. The first code and the second code may be covering codes orthogonal to each other. For example, the first code and the second code may be OCCs each having a length of 2, and may be [1 1] and [1 −1], respectively.

In operation 940, the base station 110 may transmit the first reference signal and the second reference signal in the determined beam direction. The base station 110 may transmit the first reference signal and the second reference signal in one subframe (which may be referred to as a "BRS subframe"). The subframe may include first symbols corresponding to the first reference signal and second symbols corresponding to the second reference signal. The first symbols and the second symbols may correspond to the same time-frequency resource in an RB. An orthogonal cover sequence has been applied to the first symbols and the second symbols in operations 920 and 930, and thus, even when the first symbols and the second symbols correspond to the same time-frequency resource, the terminal 120 may not experience the effect of interference.

In operation 950, the base station 110 may determine whether a reference signal has been transmitted through each of all beams. Operation 950 may correspond to operation 740 of FIG. 7.

In operation 960, the base station 110 may receive feedback information indicating an optimal reference signal. The feedback information may indicate a resource ID through which the optimal reference signal has been transmitted. For example, when the resource ID is resource ID #9, the base station 110 may detect that the optimal reference signal is a reference signal transmitted through beam #9 of the base station 110. However, since two reference signals are transmitted with different polarizations through the same resource ID #9, the feedback information may include an index (e.g., an OCC index) indicating an applied code as well as resource ID #9. For example, the index may be indicated by one-bit field. When a value of the one bit is 0, the base station 110 may identify that the optimal reference signal has been transmitted with the first polarization, and when the value of the one bit is 1, the base station 110 may identify that the optimal reference signal has been transmitted with the second polarization.

Figure 10:
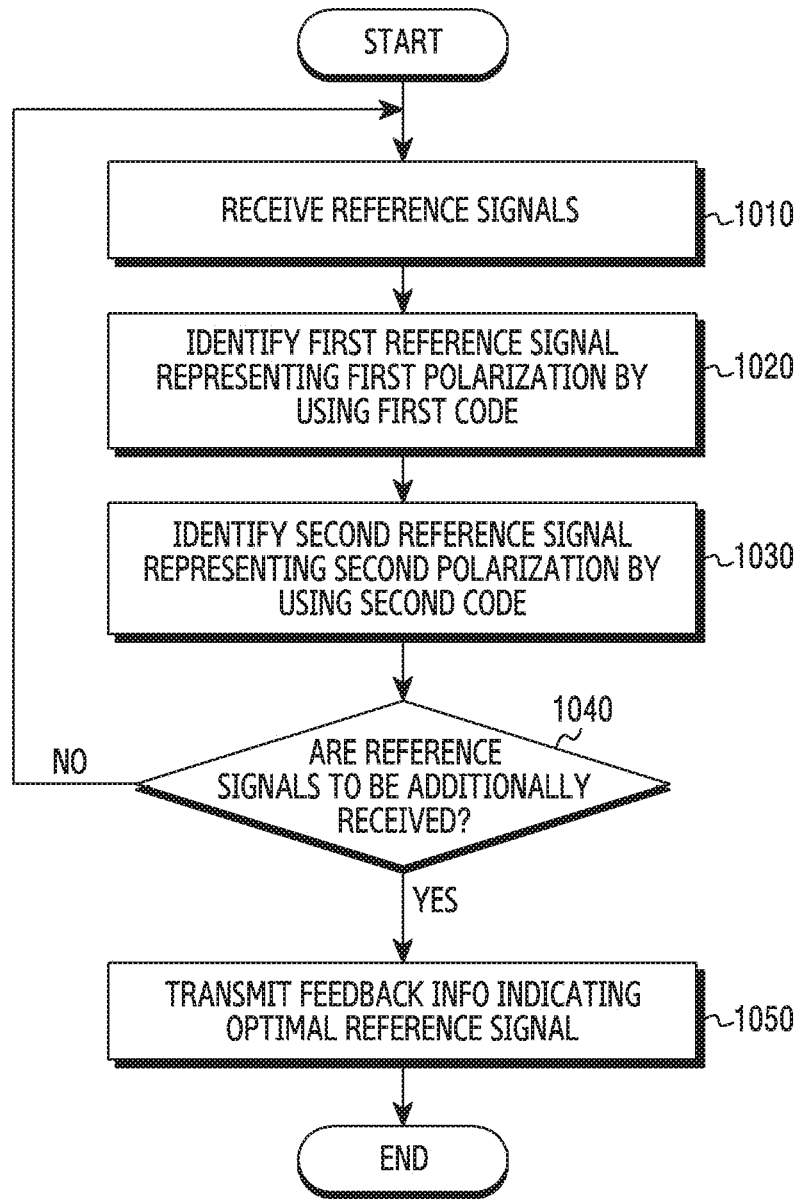
FIG. 10 illustrates a flowchart of a beam and polarization search procedure using a covering code in a terminal according to various embodiments of the disclosure.

FIG. 10 illustrates a flowchart of a beam and polarization search procedure using a covering code in a terminal according to various embodiments of the disclosure. The terminal may be the terminal 120 of FIG. 1.

Referring to FIG. 10, in operation 1010, the terminal 120 may receive reference signals. Specifically, the terminal 120 may receive one subframe including the reference signals. The subframe may be a resource allocation unit of beamformed reference signals. The reference signals may include a first reference signal of a first polarization and a second reference signal of a second polarization.

In operation 1020, the terminal 120 may decode the received reference signals by using a first code. The terminal 120 may decode the first reference signal by applying the first code to the first reference signal. The terminal 120 may decode the second reference signal by applying the first code to the second reference signal. The terminal 120 may determine that a code having been applied to the first reference signal is the first code, on the basis of a result of the decoding.

In operation 1030, the terminal 120 may decode the received reference signals by using a second code. The terminal 120 may decode the first reference signal by applying a second code to the first reference signal. The terminal 120 may decode the second reference signal by applying the second code to the second reference signal. The terminal 120 may determine that a code having been applied to the second reference signal is the second code, on the basis of a result of the decoding. The second code may be a covering sequence orthogonal to the first code.

In operation 1040, the terminal 120 may determine whether to additionally receive reference signals. Specifically, the terminal 120 may determine whether to additionally receive reference signals for generation of feedback information. In some embodiments, when the terminal 120 leaves a transmission cycle of each of the reference signals and no longer receives a subframe, the terminal 120 may determine that reference signals are not to be additionally received. In some other embodiments, the terminal 120 may determine whether to additionally receive reference signals, on the basis of the number of resources (e.g., resources corresponding to resource IDs) that the terminal 120 has been assigned by the base station 110. For example, when the terminal 120 is assigned resource regions (e.g., resource IDs #1 to #11) of a total of 11 reference signals, if the terminal 120 has received a subframe corresponding to resource ID #11 in the previous operation 1010, the terminal 120 may determine that reference signals are not to be additionally received.

When it is determined that reference signals are not to be additionally received, the terminal 120 may perform operation 1050. In contrast, when it is determined that reference signals are to be additionally received, the terminal 120 may return to operation 1010 and may attempt to additionally receive a subframe corresponding to a next resource ID.

In operation 1050, the terminal 120 may transmit feedback information indicating an optimal reference signal. The terminal 120 may identify an optimal reference signal among all the reference signals. For example, the terminal 120 may measure an RSRP value of each of all the reference signals. The terminal 120 may determine an RSRP value which is the largest among the multiple RSRP values of all the reference signals. The terminal 120 may determine that a reference signal corresponding to the largest RSRP value is an optimal reference signal.

The terminal 120 may generate feedback information indicating the optimal reference signal. The feedback information may include an index indicating a beam (Beam Index (BI)) corresponding to the optimal reference signal. For example, the feedback information may indicate resource ID #10. Although not illustrated in FIG. 10, when the base station 110 acquires resource ID #10 as feedback information, the base station 110 may recognize that the terminal 120 is located in the direction of beam #10. The feedback information may include a value (Polarization Index (PI)) representing a polarization with which the optimal reference signal has been transmitted. The value representing the polarization may be an index of an OCC applied to the optimal reference signal. For example, the value representing the polarization may be 1. Although not illustrated in FIG. 10, when the base station 110 acquires 1 as the value representing the polarization, the base station 110 may recognize that a reception gain in a case of transmission of a signal with a vertical polarization is higher than that in a case of transmission of a signal with a horizontal polarization.

As described above with reference to FIGS. 1 to 10, the base station 110 may acquire location information of the terminal 120 and antenna polarization information thereof, on the basis of feedback information acquired from the terminal 120. The base station 110 may select an optimal combination of a beam and a polarization, which maximizes reception performance of the terminal 120, on the basis of the acquired information.

In the disclosure, in order to determine whether a particular condition is fulfilled, the expression "greater than or equal to", "greater than", "less than or equal to", or "less than" is used, but this expression is only a description for expressing an example, and thus does not exclude the description of other expressions. For example, a condition described by the expression "greater than or equal to" can be replaced by a condition described by the expression "greater than". A condition described by the expression "less than or equal to" can be replaced by a condition described by the expression "less than". A condition described by the expressions "greater than or equal to" and "less than" can be replaced by a condition described by the expressions "greater than" and "less than or equal to".

Methods according to claims of the disclosure or embodiments described in the specification thereof may be implemented in hardware, software, or as a combination of hardware and software.

When the methods are implemented in software, a computer-readable storage medium configured to store one or more programs (software modules) may be provided. The one or more programs stored in the computer-readable storage medium may be configured to be executable by one or more processors within an electronic device. The one or more programs may include instructions that cause the electronic device to perform the methods according to claims of the disclosure or embodiments described in the specification thereof.

The programs (software modules or software) may be stored in non-volatile memories including a random access memory and a flash memory, a Read Only Memory (ROM), an Electrically Erasable Programmable Read Only Memory (EEPROM), a magnetic disc storage device, a Compact Disc-ROM (CD-ROM), a Digital Versatile Disc (DVD), other type optical storage devices, or a magnetic cassette. Alternatively, the programs may be stored in a memory implemented by a combination of some or all of the above-described memories. Further, the electronic device may include a plurality of such memories.

Also, the programs may be stored in an attachable storage device which may access the electronic device through a communication network, such as the Internet, the Intranet, a Local Area Network (LAN), a Wide LAN (WLAN), or a Storage Area Network (SAN), or through a communication network implemented by a combination thereof. Such a storage device may access an apparatus configured to perform embodiments of the disclosure via an external port. Further, a separate storage device on the communication network may access an apparatus configured to perform embodiments of the disclosure.

In the above-described specific embodiments of the disclosure, an element included in the disclosure is expressed in a singular or plural form according to a presented specific embodiment. However, the singular or plural expression is appropriately selected according to the presented situation for convenience of description, and the disclosure is not limited to a single element or multiple elements thereof. An element expressed in the plural form may be configured as a single element, or an element expressed in the singular form may be configured as multiple elements.

While specific embodiments have been described in the detailed description of the disclosure, it goes without saying that various changes can be made within a limit without departing from the scope of the disclosure. Therefore, the scope of the disclosure should not be limited to and defined by the above-described embodiments, and should be defined not only by the appended claims but also by the equivalents to the scope of the claims.

The invention claimed is:

1. An operating method of a base station of a wireless communication system, the operating method comprising:
    transmitting, to a terminal, a plurality of reference signals including a set of first reference signals corresponding to a first polarization and a set of second reference signals corresponding to a second polarization; and
    receiving, from the terminal, feedback information for indicating a polarization which is one of the first polarization and the second polarization and a beam of a plurality of beams,
    wherein the set of the first reference signals corresponds to the plurality of beams,
    wherein the set of the second reference signals corresponds to the plurality of beams, and
    wherein the second polarization is orthogonal to the first polarization.

2. The operating method as claimed in claim 1,
    wherein the transmitting of the plurality of reference signals to the terminal comprises:
        transmitting, in a same time-frequency resource, a first reference signal of the set of the first reference signals and a second reference signal of the set of the second reference signals to the terminal by using a same beam, and
    wherein a first covering code applied to the first reference signal is orthogonal to a second covering code applied to the second reference signal.

3. The operating method as claimed in claim 1, wherein the transmitting of the plurality of reference signals to the terminal comprises:
    transmitting, to the terminal, a reference signal corresponding to a first beam among the set of the first reference signals,
    transmitting, to the terminal, a reference signal corresponding to a first beam among the set of the second reference signals, and
    determining whether reference signals have been transmitted through all the plurality of beams.

4. The operating method as claimed in claim 3, wherein the transmitting of the plurality of reference signals to the terminal comprises:
    when reference signals are not transmitted through all the plurality of beams, changing a direction of a beam from a direction of the first beam to a direction of a second beam,
    transmitting, to the terminal, a reference signal corresponding to the second beam among the set of the first reference signals,
    transmitting, to the terminal, a reference signal corresponding to the second beam among the set of the second reference signals, and
    determining whether reference signals have been transmitted through all the plurality of beams.

5. The operating method as claimed in claim 1,
    wherein the feedback information includes information indicating a covering code applied to a reference signal corresponding to the beam indicated by the feedback information,
    wherein the covering code corresponds to one of a first code and a second code, and
    wherein the first code is applied to each of the set of the first reference signals, the second code is applied to each of the set of the second reference signals, and the first code and the second code are orthogonal to each other.

6. The operating method as claimed in claim 1, further comprising:
    identifying a plurality of resource identifiers (IDs) for the plurality of reference signals, respectively,
    wherein the plurality of resource IDs correspond to different beams and different polarizations.

7. The operating method as claimed in claim 6, wherein a reference signal corresponding to an n-th resource ID among the plurality of resource IDs:
    is transmitted using a $$\left|\frac{n}{2}\right|$$

-th beam and the first polarization, when n is an odd number, and
is transmitted using a $$\frac{n}{2}$$

-th beam and the second polarization, when n is an even number.

8. The operating method as claimed in claim 1,
wherein the feedback information includes a k-th resource ID among the plurality of resource identifiers,
wherein the k-th resource ID indicates an optimal reference signal corresponding to a combination of the beam and the polarization,
wherein, when k is an odd number, the optimal reference signal corresponds to the first polarization and a $$\left|\frac{k}{2}\right|$$

-th beam among the plurality of beams, and
wherein, when k is an even number, the optimal reference signal corresponds to the second polarization and a $$\frac{k}{2}$$

-th beam among the plurality of beams.

9. The operating method as claimed in claim 1,
wherein the feedback information includes polarization information indicating the polarization which is one of the first polarization and the second polarization, and
wherein the first polarization corresponds to a vertical polarization, and the second polarization corresponds to a horizontal polarization.

10. An operating method of a terminal of a wireless communication system, the operating method comprising:
receiving, from a base station, a plurality of reference signals including a set of first reference signals corresponding to a first polarization and a set of second reference signals corresponding to a second polarization; and
transmitting, to the base station, feedback information for indicating a polarization which is one of the first polarization and the second polarization and a beam of a plurality of beams,
wherein the set of the first reference signals corresponds to the plurality of beams,
wherein the set of the second reference signals corresponds to the plurality of beams, and
wherein the second polarization is orthogonal to the first polarization.

11. A terminal of a wireless communication system, the terminal comprising:
at least one transceiver; and
at least one processor operatively coupled to the at least one transceiver,
wherein the at least one processor is configured to:
receive, from a base station, a plurality of reference signals including a set of first reference signals corresponding to a first polarization and a set of second reference signals corresponding to a second polarization; and
transmit, to the base station, feedback information for indicating a polarization which is one of the first polarization and the second polarization and a beam of a plurality of beams,
wherein the set of the first reference signals respectively corresponds to the plurality of beams,
wherein the set of the second reference signals respectively corresponds to the plurality of beams, and
wherein the second polarization is orthogonal to the first polarization.

12. A base station of a wireless communication system, the base station comprising:
at least one transceiver; and
at least one processor operatively coupled to the at least one transceiver,
wherein the at least one processor is configured to:
transmit, to a terminal, a plurality of reference signals including a set of first reference signals corresponding to a first polarization and a set of second reference signals corresponding to a second polarization, and
receive, from the terminal, feedback information for indicating a polarization which is one of the first polarization and the second polarization and a beam of a plurality of beams,
wherein the set of the first reference signals corresponds to the plurality of beams,
wherein the set of the second reference signals corresponds to the plurality of beams, and
wherein the second polarization is orthogonal to the first polarization.

13. The base station as claimed in claim 12,
wherein the at least one processor is further configured to:
transmit, in a same time-frequency resource, a first reference signal of the set of the first reference signals and a second reference signal of the set of the second reference signals to the terminal by using a same beam, and
wherein a first covering code applied to the first reference signal is orthogonal to a second covering code applied to the second reference signal.

14. The base station as claimed in claim 12, wherein the at least one processor is further configured to:
transmit, to the terminal, a reference signal corresponding to a first beam among the set of the first reference signals,
transmit, to the terminal, a reference signal corresponding to a first beam among the set of the second reference signals, and
determining whether reference signals have been transmitted through all the plurality of beams.

15. The base station as claimed in claim 14, wherein the at least one processor is further configured to:
when reference signals are not transmitted through all the plurality of beams, change a direction of a beam from a direction of the first beam to a direction of a second beam,
transmit, to the terminal, a reference signal corresponding to the second beam among the set of the first reference signals, transmit, to the terminal, a reference signal corresponding to the second beam among the set of the second reference signals, and determine whether reference signals have been transmitted through all the plurality of beams.

16. The base station as claimed in claim 12,
wherein the feedback information includes information indicating a covering code applied to a reference signal corresponding to the beam indicated by the feedback information,
wherein the covering code corresponds to one of a first code and a second code, and
wherein the first code is applied to each of the set of the first reference signals, the second code is applied to each of the set of the second reference signals, and the first code and the second code are orthogonal to each other.

17. The base station as claimed in claim 12,
wherein the at least one processor is further configured to:
identify a plurality of resource identifiers (IDs) for the plurality of reference signals, respectively, and
wherein the plurality of resource IDs correspond to different beams and different polarizations.

18. The base station as claimed in claim 17, wherein a reference signal corresponding to an n-th resource ID among the plurality of resource IDs:

is transmitted using a $$\left\lfloor \frac{n}{2} \right\rfloor$$

-th beam and the first polarization, when n is an odd number, and is transmitted using a $$\frac{n}{2}$$

-th beam a th beam and the second polarization, when n is an even number.

19. The base station as claimed in claim 12,
wherein the feedback information includes a k-th resource ID among the plurality of resource identifiers,
wherein the k-th resource ID indicates an optimal reference signal corresponding to a combination of the beam and the polarization,
wherein, when k is an odd number, the optimal reference signal corresponds to
the first polarization and a $$\left\lfloor \frac{k}{2} \right\rfloor$$

-th beam among the plurality of beams, and
wherein, when k is an even number, the optimal reference signal corresponds to the second polarization and a $$\frac{k}{2}$$

-th beam among the plurality of beams.

20. The base station as claimed in claim 12,
wherein the feedback information includes polarization information indicating the polarization which is one of the first polarization and the second polarization, and
wherein the first polarization corresponds to a vertical polarization, and the second polarization corresponds to a horizontal polarization.

* * * * *